(12) United States Patent
Heyde

(10) Patent No.: US 6,643,631 B1
(45) Date of Patent: Nov. 4, 2003

(54) METHOD AND SYSTEM FOR MODELING FINANCIAL MARKETS AND ASSETS USING FRACTAL ACTIVITY TIME

(75) Inventor: Christopher Heyde, New York, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 09/466,528

(22) Filed: Dec. 17, 1999

(51) Int. Cl.$^7$ ................................................. G06N 5/00
(52) U.S. Cl. ..................... 706/46; 600/300; 600/509
(58) Field of Search ..................... 706/46; 382/275; 600/300, 509; 708/203

(56) References Cited

U.S. PATENT DOCUMENTS

| | | | | |
|---|---|---|---|---|
| 5,792,062 A | * | 8/1998 | Poon et al. | 600/509 |
| 5,912,993 A | * | 6/1999 | Puetter et al. | 382/275 |
| 5,938,594 A | * | 8/1999 | Poon et al. | 600/300 |
| 5,983,251 A | * | 11/1999 | Martens et al. | 708/203 |

OTHER PUBLICATIONS

C.C. Heyde and Y. Yang, *On Defining Long–Rang Dependence*, 34 J. Applied Prob. pp. 939–944 (1997).
J. Beran, *Statistics for Long–Memory Processes*, Chapman & Hall, pp. 1–40 (1994).
S.R. Hurst, E. Platen & S.R. Rachev, *Subordinated Markov Models: A Comparison*, Financial Engineering and the Japanese Markets 4: pp. 97–124 (1997).
S.R. Hurst and E. Platent, *The marginal distributions of returns and volatility*, L$_1$–Statistical Procedures and Related Topics—IMS Lecture Notes—Monograph Series vol. 31, pp. 301–314 (1997).
T. Mikosch, *Heavy Tails in Finance*, International Statistical Review, 57, pp. 109–111 (Book2) (1997).
Y. Yang, *Long Range Dependence in the Study of Time Series with Finite or Infinite Variances*, Ph.D. Dissertation, Columbia University, pp. 44–71 (1998).
S.I. Resnick, *Heavy Tail Modeling and Teletraffic Data*, The Annals of Statistics, vol. 25, No. 25, pp. 1805–1869, (1997).
R.J. Elliott, *Stochastic Calculas and Applications*, Springer–Verlag, pp. 125–138 (1982).
M. Musiela and M. Rutkowski, *Martingale Methods in Financial Modeling*, Chapter 9, Springer–Verlag, pp. 205–228 (1998).
Z. Ding & C.W.J. Granger, *Modeling volatility persistence of speculative returns: A new approach*, Journal of Econometrics, 73 (1996), pp. 185–215.
C.W.J. Granger & Z. Ding, *Varieties of long memory models*, Journal of Econometrics, 73 (1996), pp. 61–77.

\* cited by examiner

*Primary Examiner*—Wilbert L. Starks
(74) *Attorney, Agent, or Firm*—Baker Botts LLP

(57) ABSTRACT

A method and apparatus for improved modeling of random or stochastic systems such as financial markets and instruments. The Black-Scholes model for the price of a risky asset is replaced by an improved model which uses a fractal activity time process instead of a conventional time parameter. The new model is incorporated into an algorithm for analyzing empirical data in order to determine whether an observed random process exhibits multifractal or single fractal behavior. If the algorithm finds multifractal or single fractal behavior, the new model can be used, thereby providing improved accuracy over the Black-Scholes model. The algorithm can be implemented as an interactive procedure using a standard computer hardware and software platform operating under the control of suitable software for implementing the computing steps of the disclosed algorithm.

65 Claims, 13 Drawing Sheets

METHOD AND SYSTEM FOR MODELING FINANCIAL MARKETS AND ASSETS USING FRACTAL ACTIVITY TIME

FIELD OF THE INVENTION

The invention relates generally to the field of mathematical modeling of random or stochastic systems, and more particularly to modeling of the behavior of financial markets and instruments.

BACKGROUND OF INVENTION

Over the past thirty years many risky asset models have been proposed, but these are generally deficient in that they do not adequately explain key features from the statistical evidence related to the issues of heavy tails and long-range dependence (LRD) in financial time series. With regard to long-range dependence, there have been problems even with understanding the nature of the characteristic, let alone its assessment.

In particular, the Black-Scholes model for the price of a risky asset, which is widely used in the finance industry, makes two fundamental assumptions which are seriously flawed. They are:

(A) the differences of log(price) over time are "normally" distributed (i.e., the differences are a Gaussian process); and (B) the differences of log(price) over different time periods are independent.

In order to elaborate on the flaws of the conventional model, it is helpful to introduce some notation. First, a value $X_t$ is defined as $\log P_t - \log P_{t-1}$, where $P_t$ is the asset price at time t. Then, according to assumption (A), the values $\{X_t, t=1,2,\ldots\}$ are normally distributed and, according to assumption (B), the values are independent.

The problem with assumption (A) can readily be seen by studying real data. For normally distributed data, values which are more than 5 standard deviations away from the mean are very rare, with a probability less than $10^{-6}$. However, empirical studies of actual risky asset data demonstrate that observations this far away from the mean are not uncommon. The data exhibit a pronounced leptokurtic distribution (much higher peaks and heavier tails than Gaussian). In fact, large values can often be observed out to 10 standard deviations. To put these observations into perspective, consider that a $10^{-6}$ probability corresponds to a once-in-4000-years event for a normal (i.e., Gaussian) distribution of transaction data collected 5 days per week.

The problem with assumption (B) can readily be seen by examining lagged autocorrelations of the $\{X_t\}$ process. While estimated values of $\text{corr}(X_t, X_{t+k})$ die out quickly as k increases, the values of $\text{corr}(|X_t|,|X_{t+k}|)$ and $\text{corr}(X_t^2, X_{t+k}^2)$ remain significantly different from zero for long periods. In fact, non-zero values can be observed over periods of many years for some series. This has been convincingly illustrated by analysis of daily returns data from the S&P 500 index, the Nikkei index, foreign exchange rates (DM/US$), and Chevron Stock. See, e.g., Z. Ding & C. W. J. Granger, *Modeling volatility persistence of speculative returns: A new approach*, 73 J. Enconometrics 185 (1996); C. W. J. Granger & Z. Ding, *Varieties of long memory models*, 73 J. Econometrics 61 (1996). In the case of the absolute values from the S&P series, for example, the lagged autocorrelations are significantly different from zero for lags up to 2700, which is more than 10 years. The absolute values and squares of the returns exhibit LRD, classically defined (for stationary finite variance processes) as existing if $\Sigma_{k=0}^{\infty} \gamma_k$ diverges, $\gamma_k$ being the autocorrelation at lag k. For a discussion of the definition and its extensions see C. C. Heyde and Y. Yang, *On defining long-range dependence*, 34 J. Applied Prob. 939 (1997). For a comprehensive overview of the subject of LRD see J. Beran, *Statistics for Long-Memory Processes*, Chapman & Hall, New York (1994).

Yet, according to assumption (B), the functions $\text{corr}(X_t, X_{t+k})$, $\text{corr}(|X_t|,|X_{t+k}|)$, and $\text{corr}(X_t^2, X_{t+k}^2)$ should all be zero for all $k \geq 1$. In other words, assumption (B) is belied by the fact that the $\text{corr}(|X_t|,|X_{t+k}|)$ and $\text{corr}(X_t^2, X_{t+k}^2)$ functions exhibit strong dependence effects when applied to real, observed data. In addition, the actual data form a time series with high volatility and "intermittency" (clustering of extremes) quite unlike white noise. Failure to take these effects into account can adversely affect almost all probabilistic assessments involving price movements.

It is now widely appreciated that heavier tails than the normal are a necessary model feature for marginal distributions of returns. However, models with finite moments of all orders are still commonly advocated. Detailed comparisons using market index data have been given in S. R. Hurst, E. Platen, & S. R. Rachev, *Subordinated Markov models: a comparison*, Fin. Eng. Japanese Markets 97 (1997); S. R. Hurst & Platen, E., *The marginal distribution of returns and volatility*, in L₁—Statistical Procedures and Related Topics 301 (IMS Lecture Notes-Monograph Series, Vol. 31, IMS, Hayward, Calif., Y. Dodge ed., 1997). They favor a t-distribution with degrees of freedom v typically in the range 3–5. This, of course, implies an infinite k-th moment for $k \geq v$.

The above-described feature of infinite k-th moment has been observed in actual financial data. For example, multiple tests on daily data from the well-known S&P 500 Index lead to the conclusion that the 4th moment is infinite. See, e.g., T. Mikosch, *Heavy tails in finance*, 57 Bull. Internat. Statist. Inst. 109 (Book 2) (1997); Y. Yang, *Long Range Dependence in the Study of Time Series with Finite or Infinite Variances*, Ph.D. Dissertation, Columbia University (1998).

Most approaches to the marginal distribution of returns have involved the use of parametric families and the choice of a best fit within a family. Few authors have investigated general questions, such as whether particular moments are finite. Part of the difficulty has been a general supposition that tail behavior would be a power function, at least asymptotically, and that estimating the power index is problematic. Indeed, the usual method, based on the Hill estimator, is founded on order statistic theory for independent and identically distributed (hereinafter "iid") samples and can suffer from major shortcomings outside that context. See for example, the "Hill Horror Plot" and the attendant discussion in S. Resnick, *Heavy tail modeling and teletraffic data*, 25 Ann. Statist. 1805 (1997).

SUMMARY OF THE INVENTION

Accordingly, it is an object of the invention to provide a new mathematical model with better capability of predicting the behavior of random or stochastic processes such as the behavior of financial markets and instruments. The new model replaces the time parameter of the Black-Scholes model with a fractal activity time, which is a random activity time process having a heavy-tailed distribution, LRD, and stationary differences. The fractal activity time is standardized so that its mean value corresponds to the time parameter used in the Black-Scholes model.

In accordance with the invention, it is possible to test for finiteness of moments based on asymptotics obtained via the use of the ergodic theorem if the assumption of stationarity of the returns is retained. In particular, if $\Sigma_{i=1}^{n}|X_i|^p/n$ converges as $n\to\infty$, then $E|X|^p<\infty$, where $E|X|^p$ denotes the mean of $|X|^p$. If, on the other hand, $\max_{1\leq i\leq n}|X_i|^p/\Sigma_{i=1}^{n}|X_i|^p$ stays away from zero as $n\to\infty$, then $E|X|^p=\infty$. Plots as n increases for large data sets should give a clear picture.

In a method according to the invention, a random process is modeled by providing time-parameter data which corresponds to a fractal activity time process or an approximation thereof. The time-parameter data is used to determine whether the random process exhibits fractal scaling or self-similarity, in which case it is determined that the random process can be validly described using a model based on the time-parameter data.

Further objects, features, and advantages of the invention will become apparent from the following detailed description taken in conjunction with the accompanying figures showing illustrative embodiments of the invention.

BRIEF DESCRIPTION OF THE DRAWINGS

The invention is explained in greater detail below by reference to the drawings, in which.

DETAILED DESCRIPTION OF THE PREFERRED EMBODIMENTS

The New Model

Figure 1:
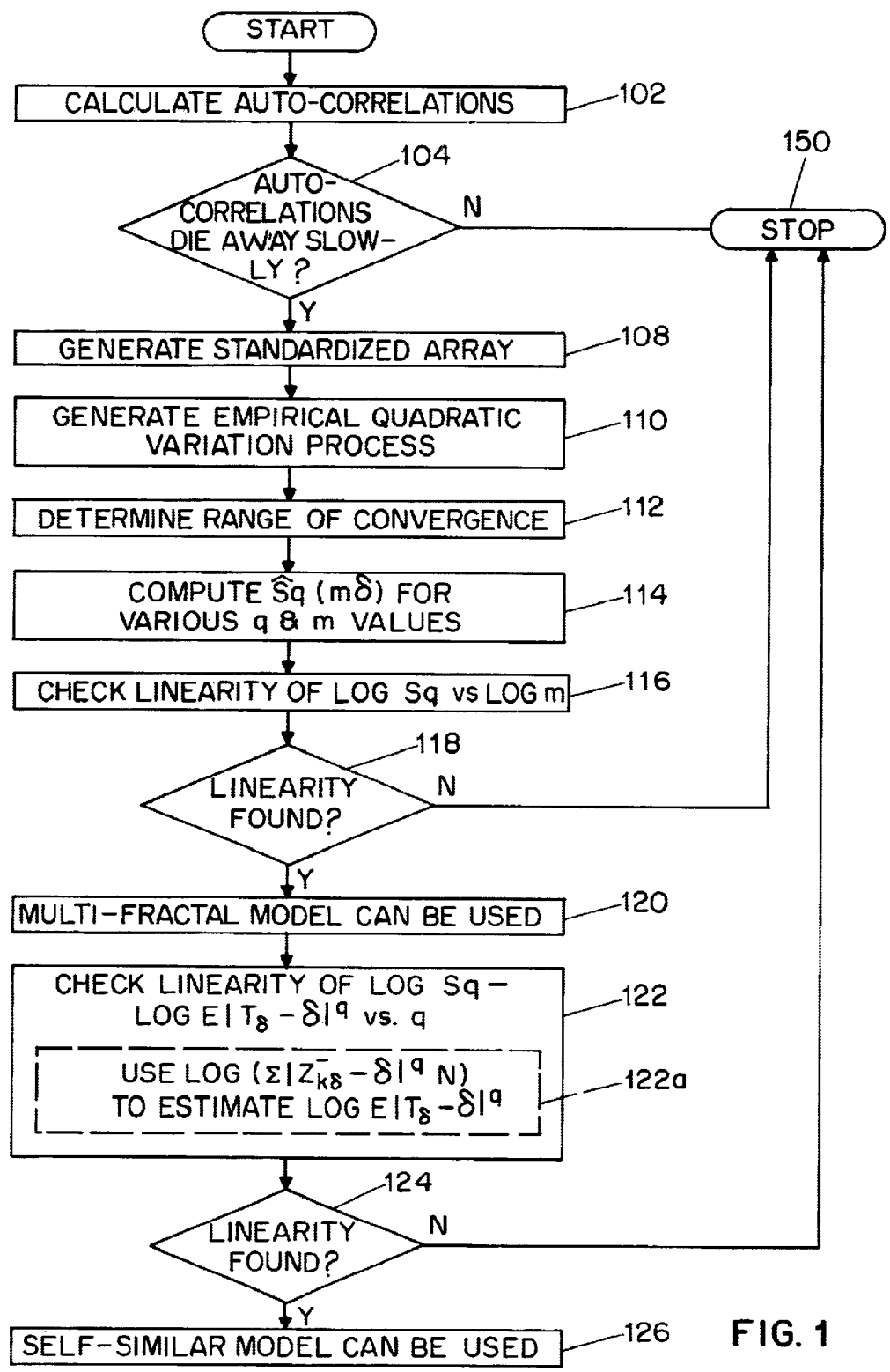
FIG. 1 is a flow diagram of an exemplary procedure for modeling the behavior of a random process in accordance with the invention.

According to the commonly used Black-Scholes model, the price $P_t$ of a risky asset at time t is:

$$P_t = P_0 \exp[\mu t + \sigma W(t)] \qquad (1)$$

where $P_0$ is the price at t=0, $\sigma^2>0$, $\mu$ and $\sigma$ are fixed constants, and W(t) is a standard Brownian motion function with respect to time t. Under this model, the corresponding log returns $$X_t = \log P_t - \log P_{t-1} = \mu + \sigma(W(t) - W(t-1)) \qquad (2)$$

are iid Gaussian with mean $\mu$ and variance $\sigma^2$.

The Black-Scholes model usually does not accurately represent the behavior of actual log returns data, since actual data tend to exhibit a pronounced leptokurtic distribution (much higher peaks and heavier tails than Gaussian). In addition, The Black-Scholes model fails to account for the strong dependence and the high volatility and intermittency of actual data, as discussed above.

In order to remedy the aforementioned shortcomings, the present invention employs a new (fractal activity time) model which replaces the Black-Scholes model by $$X_t = \log P_t - \log P_{t-1} = \mu + \sigma(W(T_t) - W(T_{t-1})) \qquad (3)$$

where $\{T_t\}$ is a (random) activity time process having a heavy tailed distribution, in order to avoid the above-described problem with assumption (A), and LRD in order to avoid the above-described problem with assumption (B). The above use of the term "heavy tailed distribution" means that $\{T_t-t\}$ has, for each fixed t, a distribution whose tail probabilities decrease faster than exponentially, for example such that log $P(|T_t-t|>x)$ behaves asymptotically like $-\alpha$ log x for large x, where $\alpha$ is a positive constant. The $\{T_t\}$ process is assumed to be independent of W(t) and to have stationary differences, i.e., the mean value of $(T_t-T_{t-1})$ does not vary with respect to t, and the distribution of $\{T_{t+s}-T_t\}$ depends only on s, not on t. In addition, the $\{T_t\}$ process is standardized so that its mean value ("$ET_t$") equals t. The "log" function in Equations (1), (2), and (3) can represent a logarithm having a base of e (i.e., a "natural logarithm"), or a logarithm having a different base (e.g., 10).

It is also to be noted that:

$$X_t = \mu + \sigma(W(T_t) - W(T_{t-1})) \stackrel{d}{=} \mu + \sigma(T_t - T_{t-1})^{1/2} W(1). \qquad (4)$$

where "$\stackrel{d}{=}$" denotes equality of finite dimensional distributions, i.e., for any finite set $(t_1, t_2, \ldots, t_k)$, the set $(X_{t_1}, X_{t_2}, \ldots, X_{t_k})$ has the same distribution as $$(\mu + \sigma(T_{t_1} - T_{t_1-1})^{1/2} W(1), \mu + \sigma(T_{t_2} - T_{t_2-1})^{1/2} W(1), \ldots, \mu + \sigma(T_{t_k} - T_{t_k-1})^{1/2} W(1)).$$

The heavy tails of the $X_t$ come from those of $\tau_t = T_t - T_{t-1}$. Also, for k=1, 2, ... and centered variables, $$cov(X_t, X_{t+k}) = 0 \qquad (5a)$$

$$cov(|X_t|, |X_{t+k}|) = \sigma^2 cov(\tau_t^{1/2}, \tau_{t+k}^{1/2}) \qquad (5b)$$

$$cov(X_t^2, X_{t+k}^2) = 3\sigma^4 cov(\tau_t, \tau_{t+k}) \qquad (5c)$$

where Equation (5c) is defined only if $E\tau_t^2 < \infty$. Thus, the LRD of $\{|X_t|\}$ and $\{X_t^2\}$ follows from that of $\{\tau_t^{1/2}\}$ and $\{\tau_t\}$, respectively. Other features of the model are conditional heteroscedasity, $$var(X_t|F_{t-1}) = \sigma^2 E(\tau_t|F_{t-1}), \qquad (6)$$

and leptokurtosis $$Kurtosis(X_t) = 3(1 + var\ \tau_t) > 3 \qquad (7)$$

if the kurtosis is finite. The kurtosis in Equation (7) is infinite if var $\tau_t$ is infinite (i.e. if $E\tau_t^2 < \infty$).

The above-described model of the present invention typically works well for return periods of a day or more. Short term effects, such as leverage, which would otherwise preferably be factored in, can then be safely ignored. For shorter return periods, a leverage parameter $\lambda$ can be used to adjust the model as follows:

$$X_t = \mu + \sigma(W(T_t) - W(T_{t-1})) - \lambda(T_t - 2T_{t-1} + T_{t-2}), \qquad (8)$$

where the time steps of 1 no longer represent days, but some shorter time interval.

LRD is often associated with fractal or multifractal scaling, which suggests a relationship of the form $$T_{ct} - ct \underset{=}{d} M(c)(T_t - t) \quad (9)$$

for positive c, where M and T are independent random functions. In Equation (9), "d" denotes equality of finite dimensional distributions, as discussed above. That is, for any positive c, and any finite set $(t_1, t_2, \ldots, t_k)$, $(T_{ct_1} - ct_1, T_{ct_2} - ct_2, \ldots, T_{ct_k} - ct_k)$ has the same distribution as $M(c)(T_{t_1} - t_1, T_{t_2} - t_2, \ldots, T_{t_k} - t_k)$. Multifractal scaling means that the time axis of $T_{ct} - ct$ can be stretched or contracted, by changing c, without changing the distribution of $T_t - t$. Self-similar (i.e., single fractal) behavior is a special case which occurs if M(c) is of the form $c^\kappa$, where $0 < \kappa < 1$. These behavioral properties have been found to be quite common for risky asset time series. Accordingly, the fractal activity time model of the present invention provides greater accuracy where financial market data on the price of a risky asset exhibits fractal scaling and/or self similarity behavior.

The presence of multifractal or self-similar behavior can be tested by an algorithm in accordance with the invention, as described below.

The Algorithm

Figure 7:
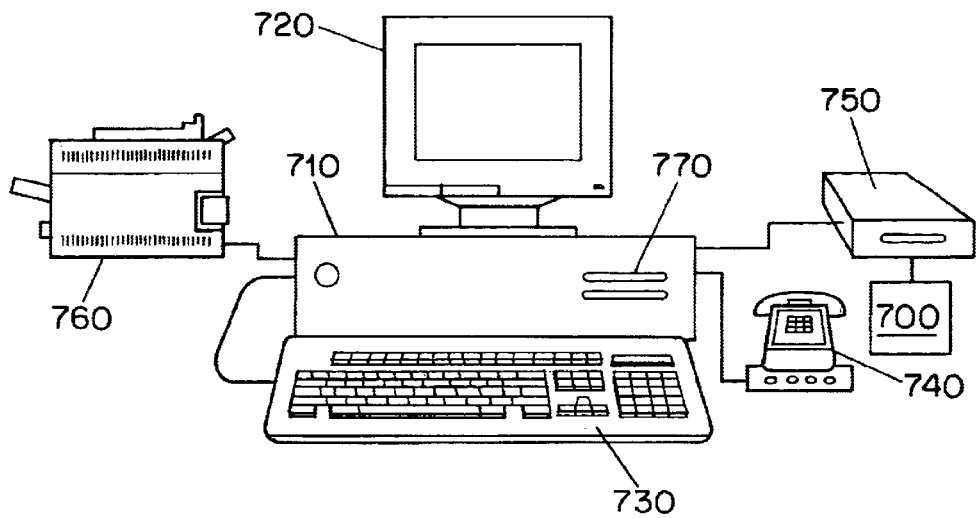
FIG. 7 is a pictorial diagram of an exemplary computer system suitable for use in practicing the invention.
Figure 8:
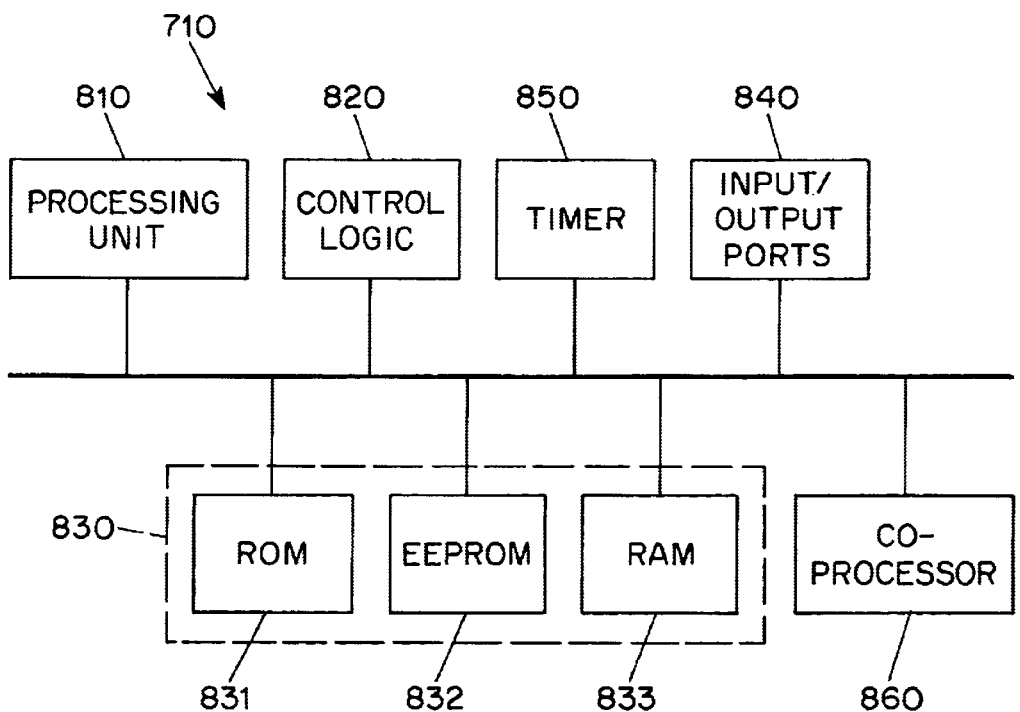
FIG. 8 is a block diagram illustrating a computer section suitable for use as a component of the computer system of FIG. 7.

Suppose, for example, that the price $P_t$ of a risky asset is observed at intervals of time each having a size of $\delta$, where the observations take place over a fixed time period $[0, \tau]$. In accordance with the invention, an algorithm can then be used to analyze empirical data such as $\{X_{k\delta}, k=0, 1, \ldots, N\}$, where $X_{k\delta} = \log P_{k\delta} - \log P_{(k-1)\delta}$ and $\tau = N\delta$. An example of such an algorithm is described below, with reference to the flow diagram of FIG. 1. Each of the steps depicted in FIG. 1 can be carried out in a manner known to those skilled in the art, by interacting with a computer apparatus such as illustrated in FIGS. 7 and 8.

In Step 102 of the flow diagram, the algorithm initially checks for failure of the Black-Scholes model by analyzing the autocorrelation functions of $\{X^2_{k\delta}\}$ and $\{|X_{k\delta}|\}$. The autocorrelation functions are calculated from the empirical data $X_{k\delta}$. For example, if the data $\{X^2_{k\delta}, k=0, 1, \ldots, N\}$ is put into a vector x, the acf(x,n) command of the "Splus" computer programming language can be used to plot the autocorrelation function of $X^2_{k\delta}$ to lag n. The "acf" function can similarly be used to calculate the autocorrelation of $|X_{k\delta}|$.

Figure 2:
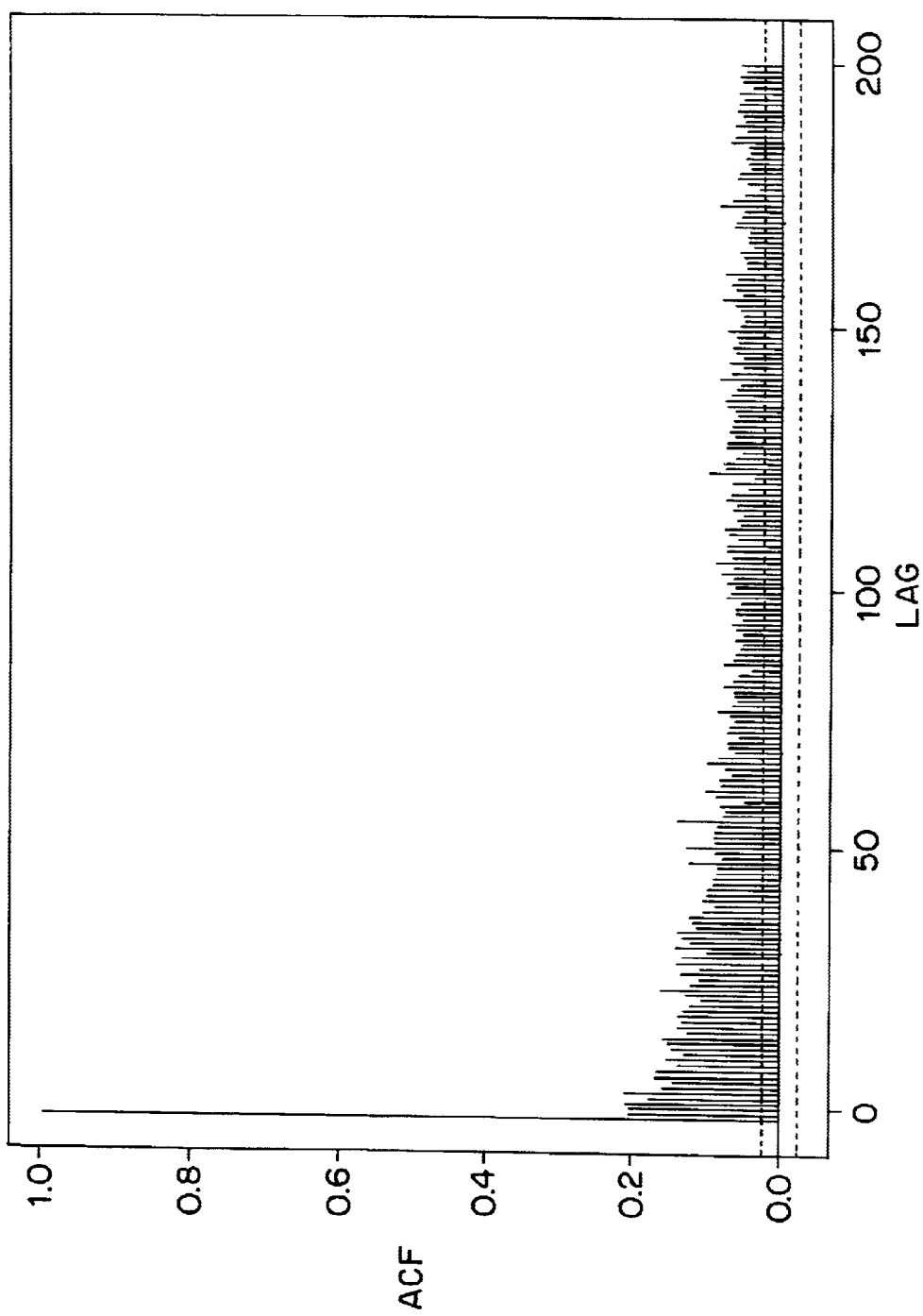
FIG. 2 is a graph illustrating an autocorrelation function of typical financial data.

In Step 104 the autocorrelations calculated in Step 102 are tested as to determine whether they die away slowly. If the autocorrelations do not die away to zero for hundreds of observations, strong LRD is present in the data, and the algorithm therefore proceeds to Step 108. On the other hand, if the autocorrelations vanish relatively quickly, the algorithm is terminated by proceeding to Step 150. FIG. 2 illustrates an example of an autocorrelation function (ACF) of $\{|X_{k\delta}|\}$ versus lag, derived from actual S&P 500 Index data, in which LRD is evident.

It is to be noted that the $X_{k\delta}$ are obtained from Equation (3) by replacing the time intervals of 1 by those of $\delta$. That is, $$X_{k\delta} = \log P_{k\delta} - \log P_{(k-1)\delta} = \mu\delta + \sigma(W(T_{k\delta}) - W(T_{(k-1)\delta})). \quad (10)$$

Then, since $E(W(T_t)) = 0$ for all t, it follows that $EX_{k\delta} = \mu\delta$. Also since $$W(T_{k\delta}) - W(T_{(k-1)\delta}) \underset{=}{d} (T_{k\delta} - T_{(k-1)\delta})^{1/2} W(1) \quad (11)$$

and $T_{k\delta} - T_{(k-1)\delta} \underset{=}{d} T_\delta$, it follows that $$\text{var} X_{k\delta} = \sigma^2 E T_\delta W(1)^2 = \sigma^2 \delta, \quad (12)$$

since $T_\delta$ is independent of W(1) with $ET_\delta = \delta$ and $EW(1)^2 = 1$.

Since, as discussed above, for each k, $EX_{k\delta} = \mu\delta$ and var $X_{k\delta} = \sigma^2\delta$, it can be advantageous to standardize the array $X_{k\delta}$ so that it is unnecessary to further account for the unknown parameters $\mu$ and $\sigma$. Accordingly, in Step 108 of the flow diagram of FIG. 1, the algorithm generates a standardized array $\{Z_{k\delta}, k=0, 1, \ldots, N\}$, where:

$$Z_{k\delta} = (X_{k\delta} - \hat{\mu})/\hat{\sigma}, \quad (13)$$

and $$\hat{\mu} = \sum_{k=0}^{N} X_{k\delta}/(N+1), \quad \hat{\sigma}^2 = \sum_{k=0}^{N} (X_{k\delta} - \hat{\mu})^2/(N+1). \quad (14)$$

$\hat{\mu}$ is an estimate of the mean of $X_{k\delta}$, and $\hat{\sigma}^2$ is an estimate of the variance of $X_{k\delta}$, where both are calculated from the empirical data.

It is then possible to produce an approximation of the activity time process $\{T_t\}$, based on the empirical data. The approximation is based upon Ito's formula, which is well-known in the field of stochastic calculus. See, e.g., R. J. Elliott, *Stochastic Calculus and Applications,* Springer, New York (1982). Under Ito's formula:

$$\sigma^2 T_t = \int_0^t (d \log P_S)^2, \quad (15)$$

the right hand side being called the quadratic variation. This is a standard result in stochastic calculus. The above equation can be put in discrete (as opposed to continuous) form by replacing the $$\int_0^t (d \log P_S)^2 \text{ with } \sum_{k=0}^{N} (\log P_{k\delta} - \log P_{(k-1)\delta} - \mu\delta)^2,$$

which equals $$\sum_{k=0}^{N} (X_{k\delta} - \mu\delta)^2.$$

$T_t$ is replaced by $T_{n\delta}$ to yield the discrete approximation:

$$\sigma^2 T_{n\delta} \simeq \sum_{k=0}^{N} (X_{k\delta} - \mu\delta)^2. \quad (16)$$

This equation can be put in standardized form such that:

$$T_{n\delta} \simeq \sum_{k=0}^{N} Z_{k\delta}^2. \quad (17)$$

As the interval δ approaches zero, the discrete approximation becomes exact.

To produce the approximation of $\{T_t\}$, the algorithm, in Step 110 of FIG. 1, generates an array $\{\hat{T}_{n\delta}, n=1,2,\ldots,N\}$ where $$\hat{T}_{n\delta} = \sum_{k=1}^{n} Z_{k\delta}^2.$$

Figure 3A:
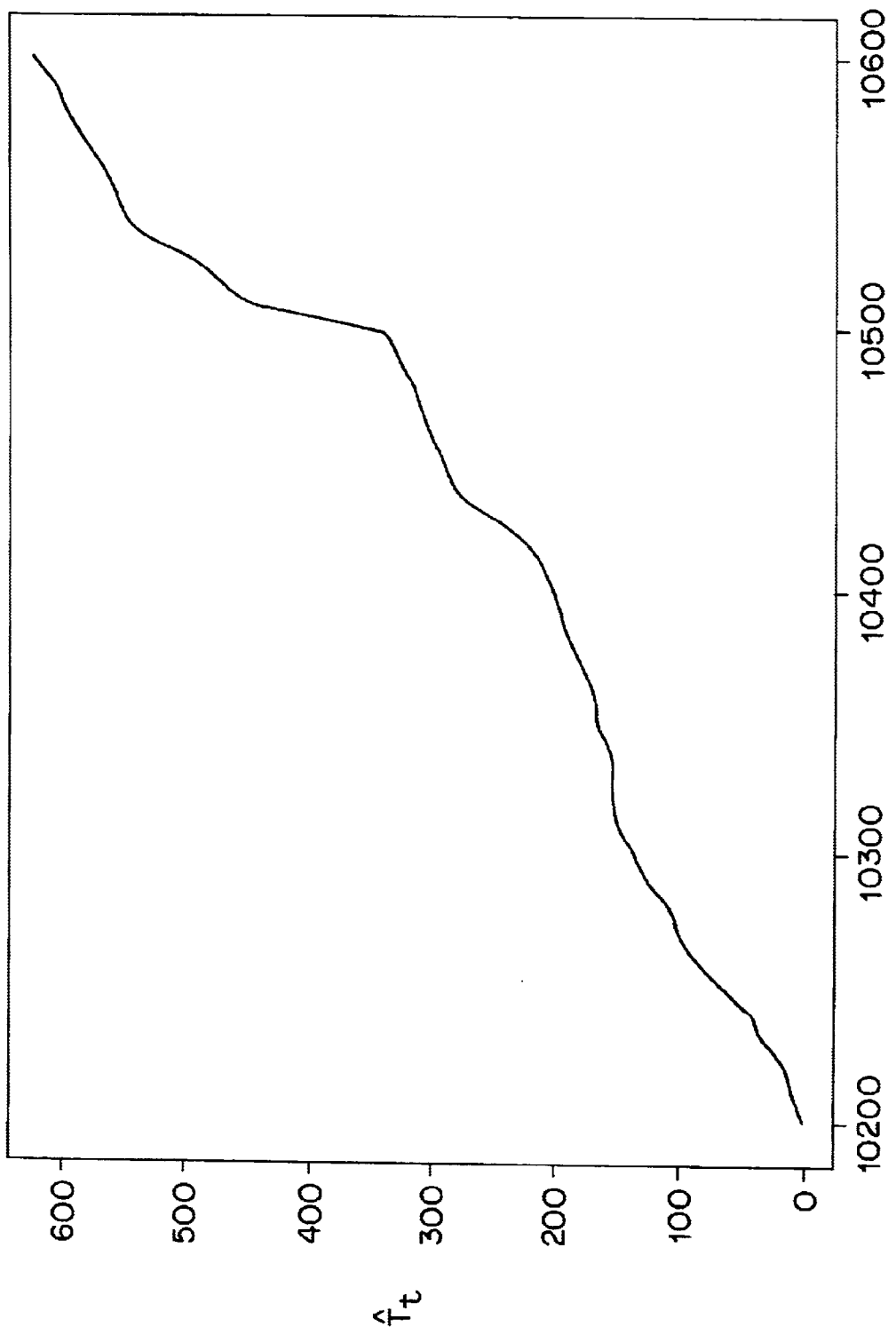
FIG. 3a is a graph illustrating the behavior of an exemplary fractal activity time in accordance with the invention, plotted with respect to a conventional time parameter.
Figure 3B:
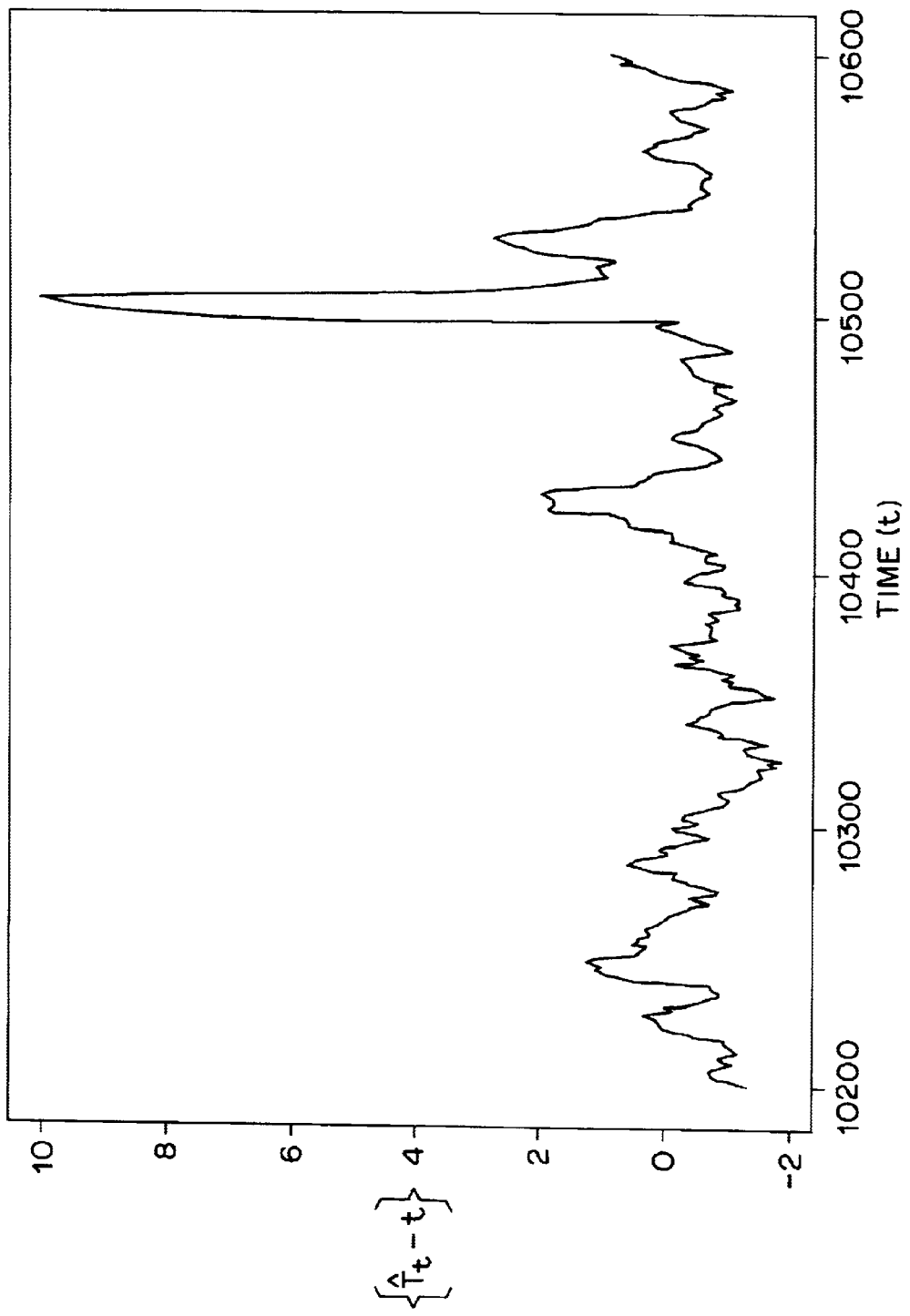
FIG. 3b is a graph illustrating the behavior of a $\{T_t-t\}$ process, plotted with respect to a conventional time parameter t, where $T_t$ is an exemplary fractal activity time in accordance with the invention.

As discussed above, the empirical quadratic variation process $\{\hat{T}_{n\delta}\}$ serves as an approximation of the $\{T_{n\delta}\}$ process. Convergence should take place under broad conditions as δ decreases. For illustration, FIG. 3a shows an example of a relationship between $\hat{T}_t$ and t for a set of actual data, and FIG. 3b shows a corresponding plot of $\{\hat{T}_t - t\}$ versus t.

It is noted that the empirical quadratic variation process $\{\hat{T}_{n\delta}\}$ approximates the (unobserved) activity time process $\{T_{n\delta}\}$ in the following sense. As the time interval δ between observations decreases, the $\hat{T}$ process converges to the T process with probability 1. That is, $\max_{0 < t < \tau} |\hat{T}_t - T_t| \to 0$ with probability one for any fixed τ>0. The approximation is satisfactory even for daily data as only broad features, like averages of the $\hat{T}$ are used, and not fine detail.

Figure 4:
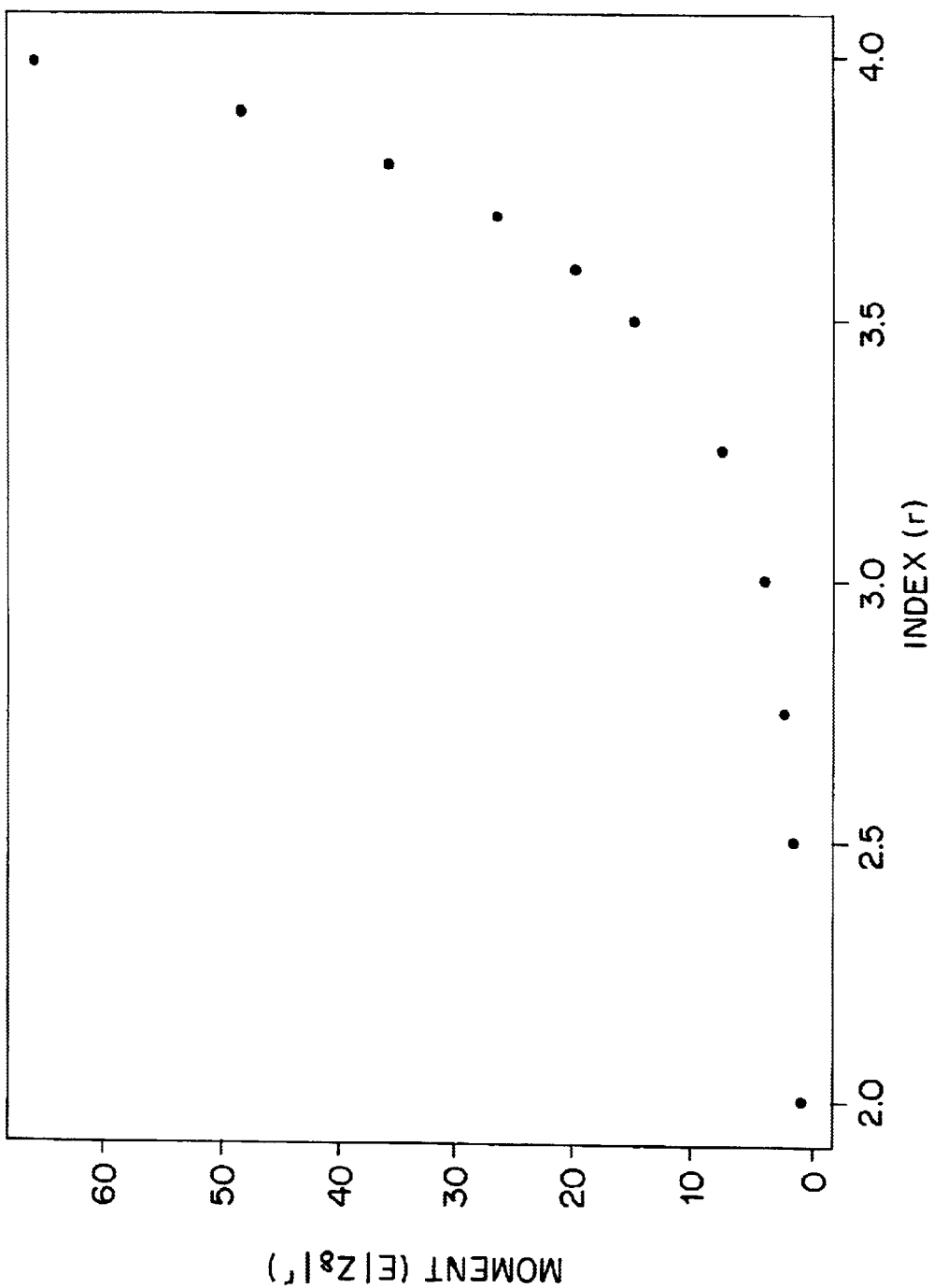
FIG. 4 is a graph illustrating an exemplary moment function of typical financial data.
Figure 5A:
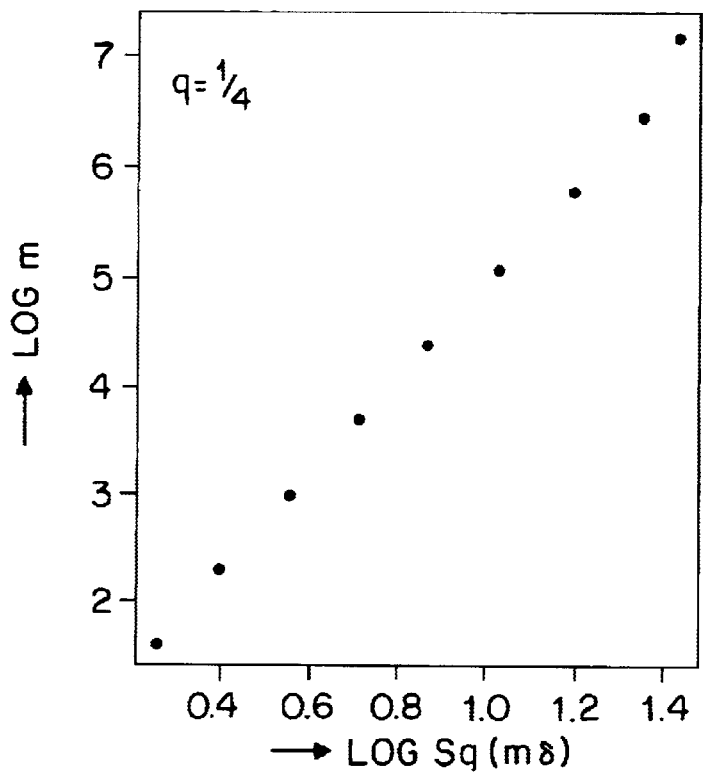
FIGS. 5a–f are graphs illustrating the linearity of a log moment function generated by a method according to the invention.
Figure 5B:
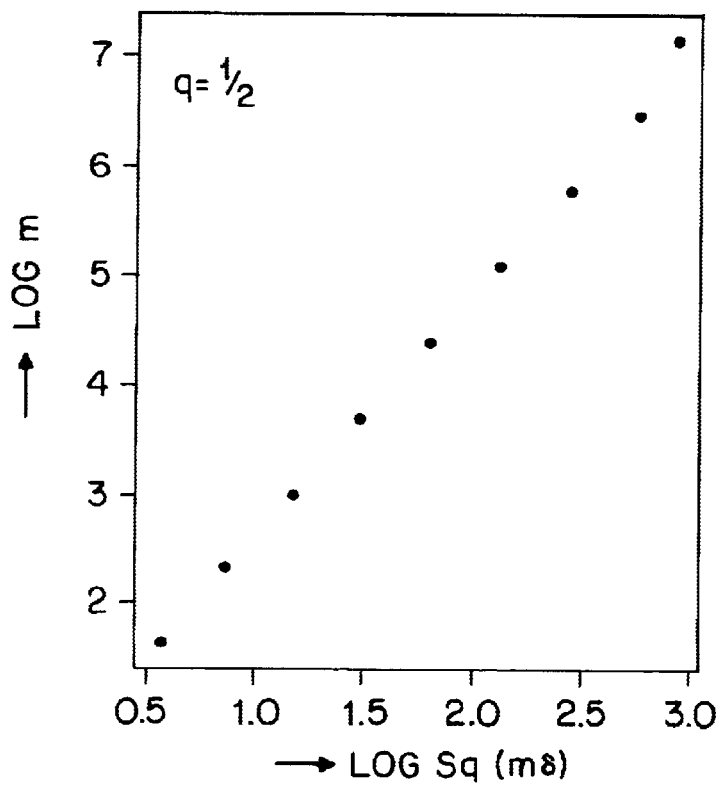
Figure 5C:
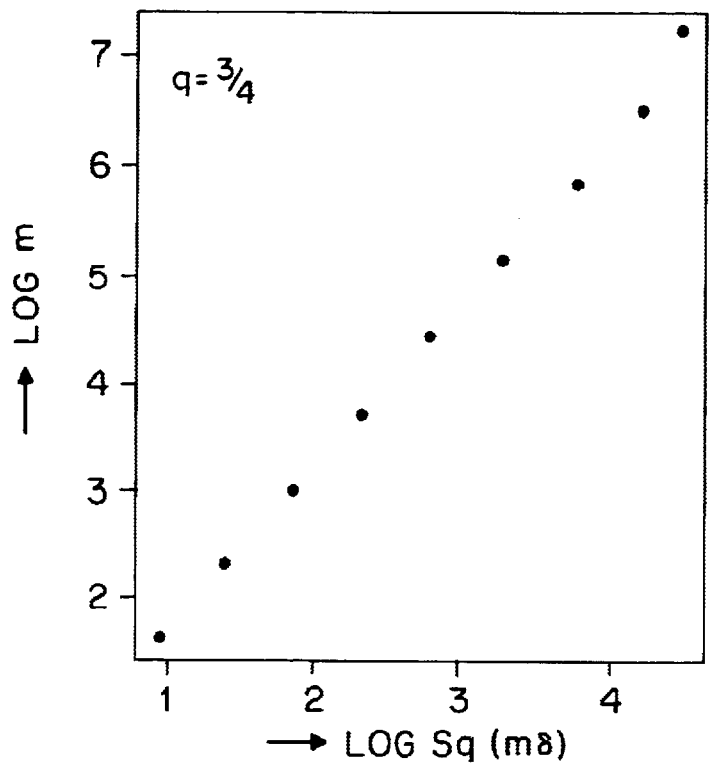
Figure 5D:
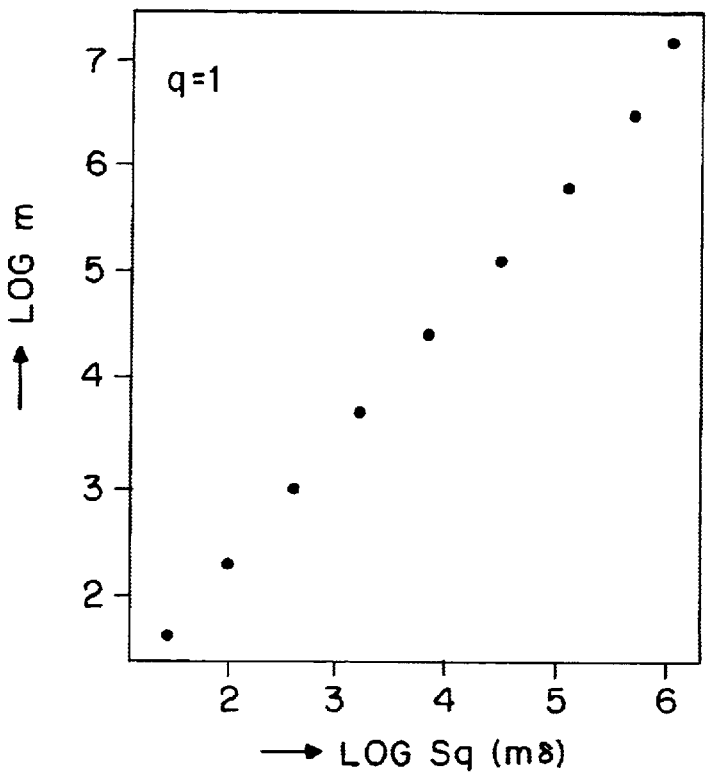
Figure 5E:
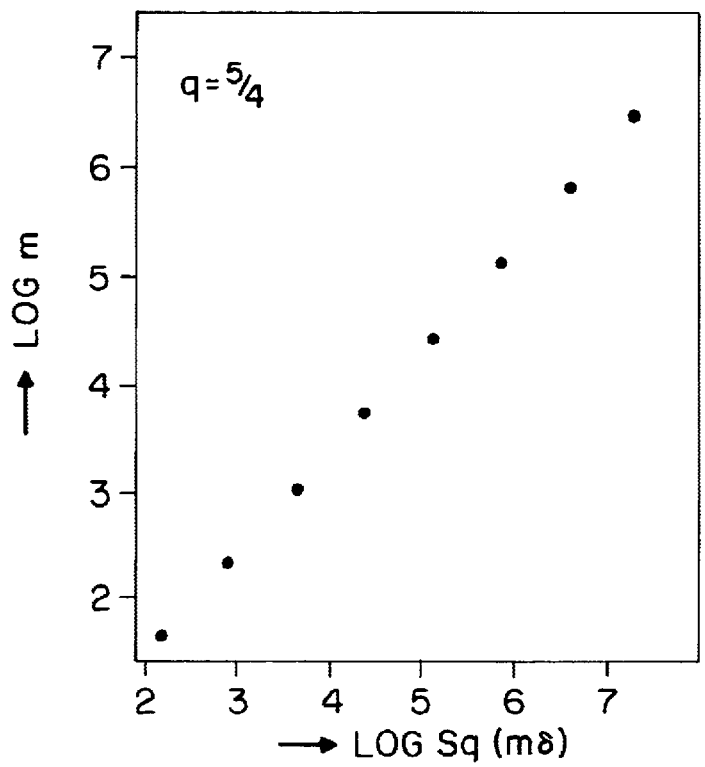
Figure 5F:
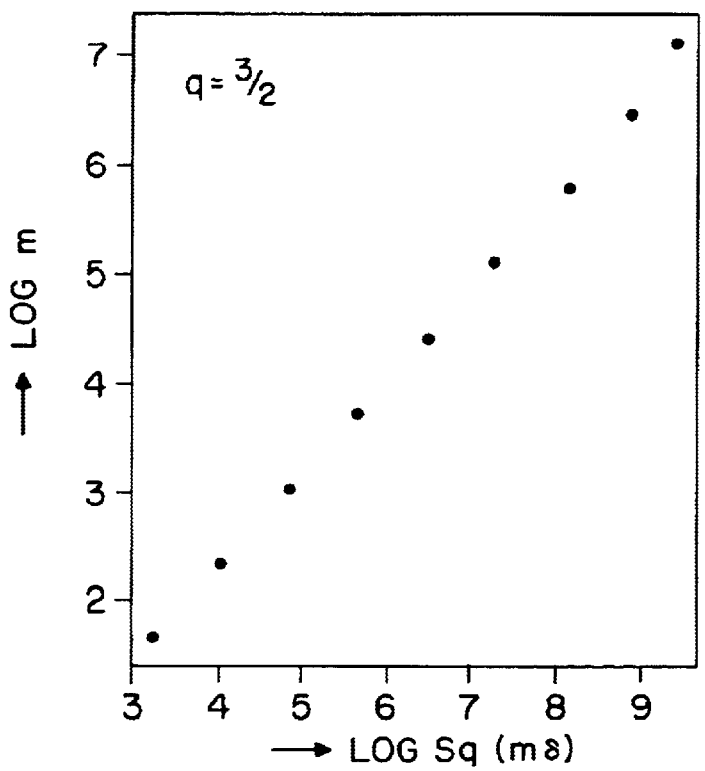
Figure 6A:
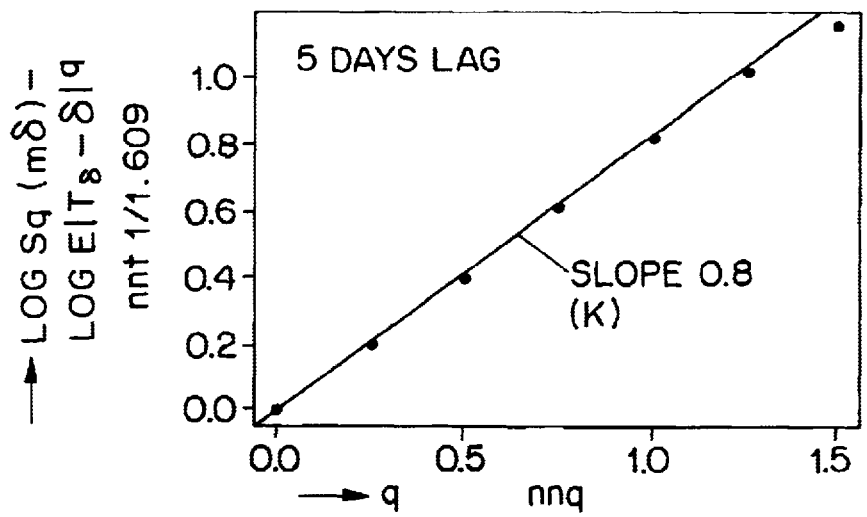
FIGS. 6a–i are graphs illustrating the linearity of another function generated by a method according to the invention.
Figure 6B:
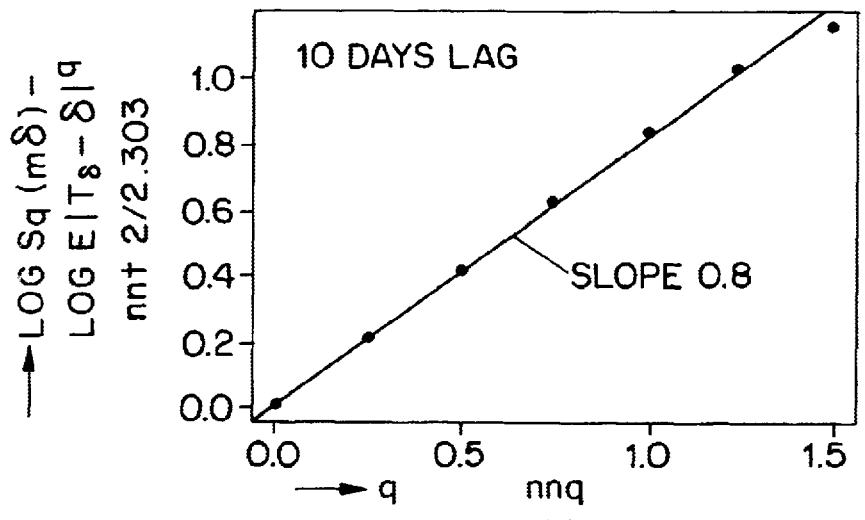
Figure 6C:
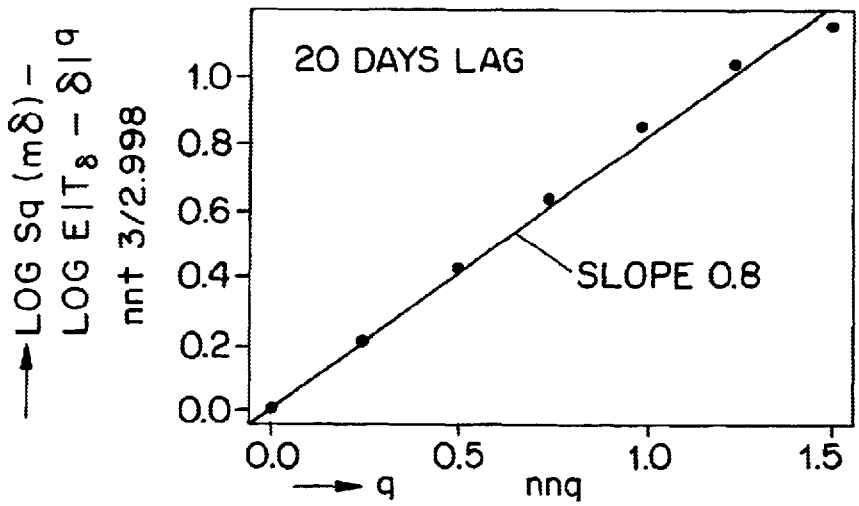
Figure 6D:
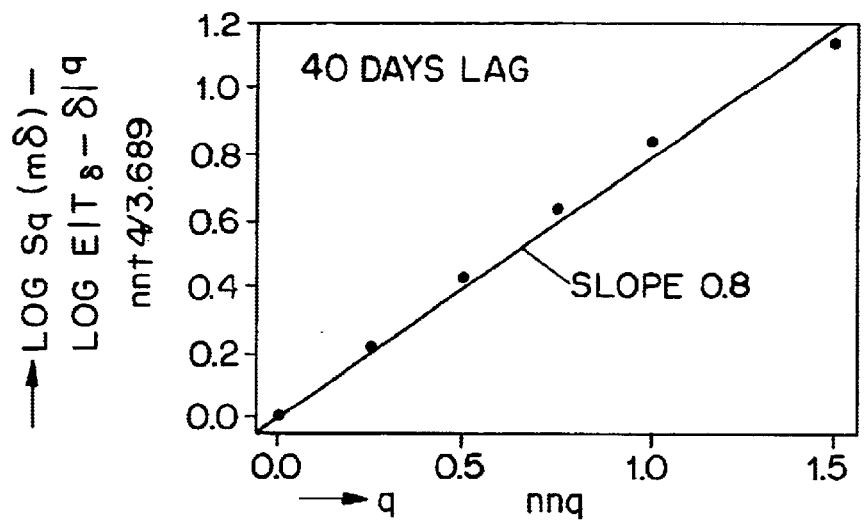
Figure 6E:
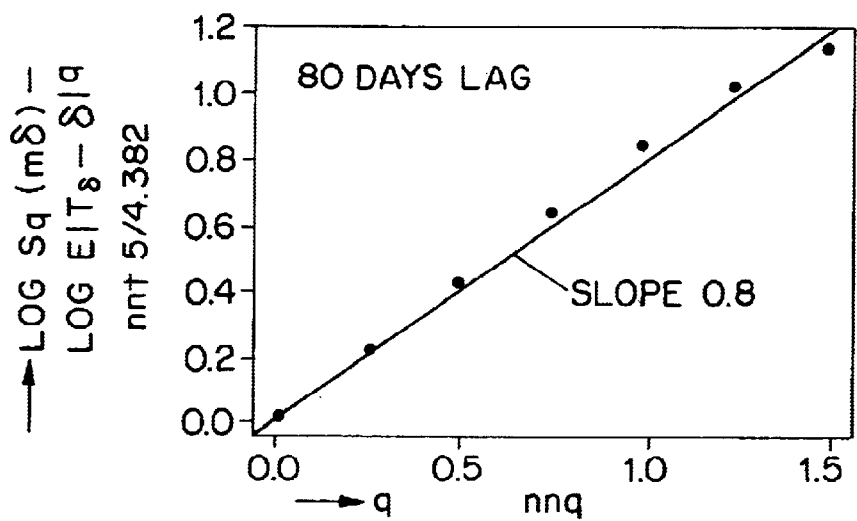
Figure 6F:
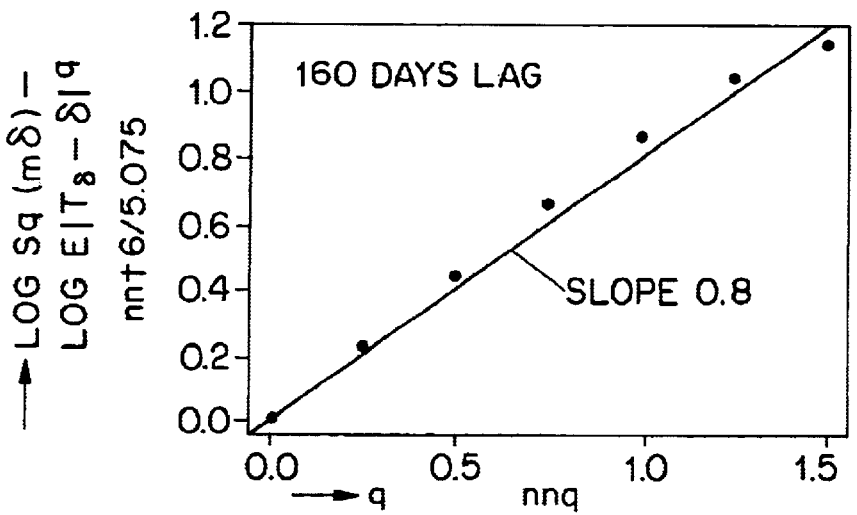
Figure 6G:
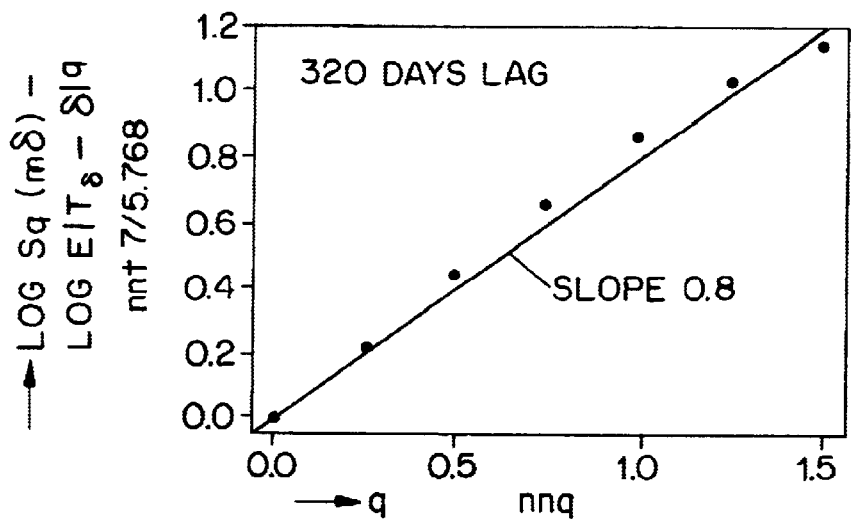
Figure 6H:
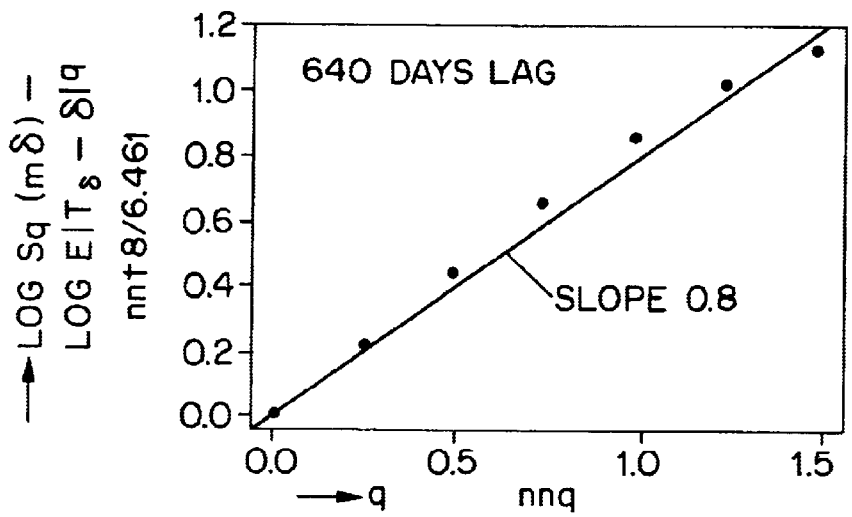
Figure 6I:
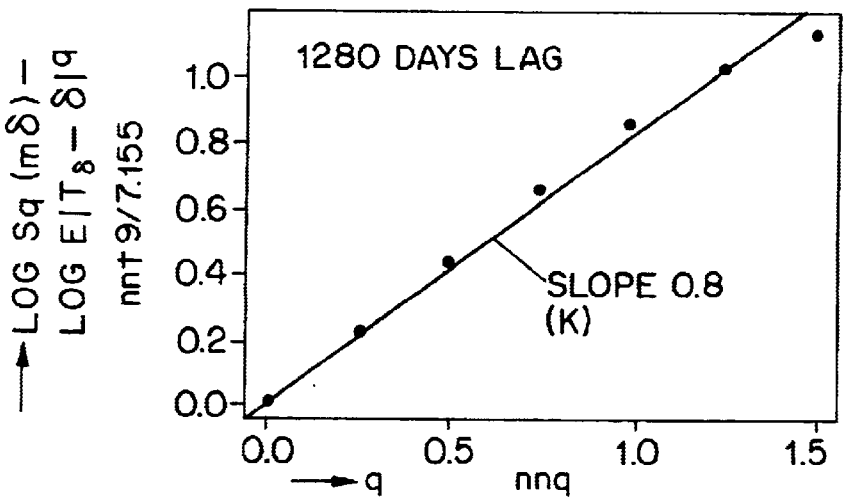

Next, using $E|\hat{T}_\delta|^p$ as an approximation of $E|T_\delta|^p$, the algorithm, in Step 112 of FIG. 1, determines the range of p values for which $E|T_\delta|^p < \infty$, or equivalently, $E|X_\delta|^{2p} < \infty$, where $\hat{T}_\delta$ denotes $T_{n\delta|n=1}$, $T_\delta$ denotes $T_{n\delta|n=1}$, and $X_\delta$ denotes $X_{n\delta|n=1}$. In other words, the algorithm determines the range of p values for which the p-th moment of $\{T_{n\delta}\}$ and the 2p-th moment of $\{X_{n\delta}\}$ are finite. Since the process has stationary differences, $T_\delta$ has the same distribution as $T_{k\delta} - T_{(k-1)\delta}$ for all k. Similarly for Xδl. Empirical studies suggest that the maximum value of p is ordinarily less than 3 and sometimes less than 2, but generally greater than 1.5. For example, if the data $Z_{k\delta}$ is put into a vector Z, a routine written in Splus can calculate mean((abs(Z))$^r$) for a range of r values (e.g., at intervals of 0.25), where r=2p, until the resulting function begins to increase steeply, indicating that the limit of the range of convergence of both $|Z_\delta|^p$ and $|X_\delta|^{2p}$ is being approached. The results of such a procedure are illustrated in FIG. 4, which shows a plot of "moment" $E|Z_\delta|^r$ versus "index" r, based on S&P 500 Index data. The plot shows the range of values of p for which convergence takes place for an empirical quadratic variation process calculated from the aforementioned exemplary set of actual index data. The plot suggests that for r<4, the value of the moment $E|Z_\delta|^r$ is finite, meaning that the moment converges. However, for r≧4, the moment becomes extremely large, suggesting that it approaches ∞ for such larger values of r.

Next, in Step 114 of the flow diagram of FIG. 1, the algorithm computes a set of values of the function $$\hat{S}_q(m\delta) = \sum_{k=1}^{[N/m]} |\hat{T}_{km\delta} - \hat{T}_{(k-1)m\delta} - m\delta|^q / N, \tag{18}$$

where m is an integer and "[N/m]" denotes the integer part of N/m. In Step 114, log $\hat{S}_q(m\delta)$ is computed for a wide range of q and m values. Values of q are chosen such that $0 < q \leq p$, where p has been determined from Step 112 to ensure that $E|T_\delta|^p < \infty$. For example, values of q can be selected at intervals of 0.25. The selected values of m can be, for example, $2, 2^2, \ldots, 2^{10}$.

If the random process being analyzed obeys Equation (9), and if $$S_q(m\delta) = \sum_{k=1}^{N} |T_{km\delta} - T_{(k-1)m\delta} - m\delta|^q / N \tag{19}$$

then $$ES_q(m\delta) = E|T_{m\delta} - m\delta|^q = E|M(m)|^q E|T_\delta - \delta|^q. \tag{20}$$

Furthermore, Equation (9) implies that $$\log E|M(m)|^q = \log E|M(e)|^q \log m. \tag{21}$$

In addition, the ergodic theorem widely used in probability states that if $\{W_k, k=1, 2, \ldots\}$ is a stationary process, and $E|W_1| < \infty$, then $$n^{-1} \sum_{k=1}^{n} W_k \to EW_1 \tag{22}$$

almost surely (hereinafter "a.s.", which indicates an outcome with probability=1) as n→∞.

Moreover, for large enough sample sizes, log $\hat{S}_q(m\delta)$ approaches, and can therefore be used to approximate, log $ES_q(m\delta)$.

Therefore, using the ergodic theorem, $$\log \hat{S}_q(m\ \delta) \stackrel{a.s.}{\to} \log ES_q(m\delta) = \log E|M(e)|^q \log m + \log E|T_\delta - \delta|^q \tag{23}$$

which is linear with respect to logm as N→∞. Accordingly, the algorithm, in Step 116, checks for linearity of log $S_q(m\delta)$ with respect to log m using the previously calculated values of $\hat{S}_q(m\delta)$ as an approximation for $S_q(m\delta)$. Linearity can often be checked by visual observation on a computer display or a hard copy of a graphical plot of log $S_q(m\delta)$ versus log m. If linearity is found in Step 118, this indicates that a multifractal model can properly be used to describe $\{T_t - t\}$ and the algorithm proceeds to Step 120. Multifractal behavior means that scaling or magnifying the time axis of the $\{T_t - t\}$ function will produce a function with an identically-shaped probability density distribution. If linearity is not found in Step 118, the algorithm proceeds to Step 150 and terminates.

A self-similar (i.e., single fractal) model can be used in the special case where, in Equation (9), $M(c) \equiv c^\kappa$ for all c and some κ (i.e., where 0<κ<1). In such a case, $$\log E|M(m)|^q = q\kappa \log m \tag{24}$$

and Equation (23) becomes $$\log \hat{S}_q(m\delta) \stackrel{a.s.}{\to} \log ES_q(m\delta) = qK\log m + \log E|T_\delta - \delta|^q \tag{25}$$

Accordingly, the algorithm, in Step 122, checks log $S_q(m\delta)$–log $E|T_\delta - \delta|^q$ for linearity with respect to q, again using the previously calculated values of $\hat{S}_q(m\delta)$ as approximations for $S_q(m\delta)$. In Step 122a log $E|T_\delta - \delta|^q$ is estimated by $$\log\left(\sum_{k=1}^{N} |Z_{k\delta}^2 - \delta|^q / N\right).$$

Linearity can again often be checked by eye using a computer display or a hard copy of the graphical representation of the relation set forth in Step 112. If linearity is found in the test of Step 124, then a self-similar model satisfactorily represents the process $\{T_t-t\}$, and the algorithm proceeds to Step 126. If linearity is not found in this test of Step 124, the algorithm proceeds to Step 150 and terminates.

An exemplary interactive computing procedure for carrying out the exemplary algorithm represented by the flow diagram 100 in FIG. 1 is provided in the Appendix hereto. The computing steps of the procedure are expressed in the Splus programming language, but other programming languages can also be used.

Results Obtained for Specific Examples of Financial Data Sets

EXAMPLE 1

Modeling of Behavior of S&P 500

FIGS. 5a–f and 6a–i show results generated by an algorithm in accordance with the invention, using as input 20 years of daily data from the S & P 500 Index. To generate these results, the S&P 500 Index data, represented by the vector $\{P_{k\delta}, k=0, 1, \ldots, N\}$, were used to calculate the vector $X_{k\delta}=\log P_{k\delta}-\log P_{(k-1)\delta}$. The vector $\{X_{k\delta}\}$ was then used to generate the vector $Z_{k\delta}=(X_{k\delta}-\hat{\mu})/\hat{\sigma}$ as discussed above with respect to the exemplary algorithm of the invention. The vector $\{Z_{k\delta}\}$ was then used to generate the vector $\{\hat{T}_{n\delta}, n=1,2, \ldots, N\}$, where $$\hat{T}_{n\delta} = \sum_{k=1}^{n} Z_{k\delta}^2.$$

The vector $\{\hat{T}_{n\delta}\}$ was then used to calculate the value of the function $$\hat{S}_q(m\delta) = \sum_{k=1}^{[N/M]} |\hat{T}_{km\delta} - \hat{T}_{(k-1)m\delta} - m\delta|^q / N$$

for various values of q and m. The resulting values of the function $\hat{S}_q(m\delta)$ were used to approximate $S_q(m\delta)$ in order to calculate log $S_q(m\delta)$. In addition, the vector $\{\hat{T}_{n\delta}\}$ was used to approximate $\{T_{n\delta}\}$ in order to calculate log $S_q(m\delta)-$log $E|T_\delta-\delta|^q$. The resulting values of log $S_q(m\delta)$ and log $S_q(m\delta)-$log $E|T_\delta-\delta|^q$ were used to produce the plots in FIGS. 5a–f and 6a–i.

The results are provided in order to illustrate the effectiveness of the algorithm. In FIGS. 5a–f, log $S_q(m\delta)$ is plotted on the horizontal axis, and log m is plotted on the vertical axis. In FIGS. 6a–i, q is plotted on the horizontal axis and log $S_q(m\delta)-$log $E|T_\delta-\delta|^q$ is plotted on the vertical axis. The data in the figures, which clearly illustrate the linearity of log $S_q(m\delta)$ with respect to log m (FIGS. 5a–f), and the linearity of log $S_q(m\delta)-$log $E|T_\delta-\delta|^q$ with respect to q (FIGS. 6a–i), demonstrate that a self-similar model with κ=0.8 for $\{T_t-t\}$ provides a good representation of an exemplary random process in real life. The linearity of the above-described plots indicates that the value of the S&P 500 Index can be modeled, in accordance with the invention, by the function $$P_t=P_o \exp[\mu t+\sigma W(T_t)] \quad (26)$$

where $P_o$ is the value of the Index at t=0, $\mu$ and $\sigma>0$ are fixed constants, W(t) is a standard Brownian motion function, and $T_t$ is a random activity time process which is approximated by the vector $\{\hat{T}_{n\delta}\}$ that is generated as described above. In other words, the S&P 500 index can be modeled by the discrete function $$P_{n\delta}=P_o \exp[\mu n\delta+\sigma W(\hat{T}_{n\delta})] \quad (27)$$

It has been found from other similar investigations that good self-similar fits can be obtained for a wide range of time series data. The computer implemented steps of an algorithm in accordance with the invention can, optionally, be implemented in Splus, C, C+, C++, BASIC, FORTRAN, or any other suitable computer programming language. The models in accordance with the invention have characteristics which differ substantially from those of the Black-Scholes model. They can provide significant improvement in the accuracy of assessed risk calculations involving financial data.

It is to be noted that the increments of the process $\{T_t-t\}$ can easily be shown to be LRD (SAV) for κ>1/p if $E|T_1-1|^p<\infty$ for some p, where 0<p<2. C. C. Heyde & Y. Yang, *On defining long-range dependance*, 34 J. Applied Prob. 939 (1997). The notation "LRD (SAV)" refers to a sample Allen variance based definition of LRD which copes with processes having possible infinite variance, such as is the case here, but which essentially reduces to the classical definition in the finite variance case. Such characteristics readily explain the empirically observed strong dependence.

EXAMPLE 2

Valuation of a European Call Option

The present invention can, for example, be used to valuate a European Call Option for a traded security where the time parameter data generated from the price data of the security over time exhibits self similarity, such that the security price can be modeled as a random process in accordance with the present invention so that a model of the price of the security in accordance with the present invention affords a higher degree of accuracy than the prior art. The market price of the security at time t is denoted by $P_t$. A European Call Option for such a security gives a holder of the option the right, but not the obligation, to buy the security when it matures at time $t_1$ for the exercise price K. The value of such an option $C(t,t_1,K)$ at time $t<t_1$ may be calculated under the fractal activity time model assuming a fixed interest rate r for bonds.

As an initial step in valuating the European Call Option, it is necessary to generate an array $\{\hat{T}_{n\delta}, n=1,2, \ldots, N\}$ by using an algorithm in accordance with the invention to process an array of price data $\{P_{k\delta}\}$ representing the history of the price $P_t$ of the underlying security. For example, an algorithm such as illustrated by the flow diagram 100 of FIG. 1 can be used to generate $\{\hat{T}_{n\delta}\}$, which can be used to approximate the fractal activity time process $\{T_t\}$ in the subsequent calculations. In addition, the algorithm calculates the fractal scaling parameter κ of Equation (24).

It is to be noted that the activity time process $\{T_t\}$ is independent of the $\{W\}$ process in the model. Then, conditionally on a fixed outcome for the $\{T_t\}$ process, the fractal activity time model can be written in geometric Brownian motion form as $$\log P_t=\mu t+\sigma W(T_t) \quad (28)$$

which differs from the Black-Scholes formulation in that $T_t$ is a function of t. We initially assume that $T_t$ is non-random with respect to t.

The standard Black-Scholes formula calculation gives the result in the risk-neutral (i.e., arbitrage is not allowed) valuation form that $$E(C(t,t_1,K))=e^{-r(t_1-t)}\tilde{E}((P_{t_1}-K)^+|\mathcal{F}_t) \quad (29)$$

where $\tilde{E}$ is the expectation with respect to a new measure for the discounted price, $x^+=\max(0,x)$, where $x=P_{t_1}-K$, and the conditioning is on the past history $\mathcal{F}_t$ of the security price up to time t. This calculation applies unchanged to the fractal activity time model conditioned on fixed (i.e., non-random, with known history) $\{T_t\}$, which gives $$E(C(t,t_1,K)|\{T\})=e^{-r(t_1-t)}\tilde{E}((P_{t_1}-K)^+|\mathcal{F}_t) \quad (30)$$

However, under this new measure for the fractal time model, still conditioned on fixed $\{T_t\}$, there is $W^*$ (t) given by $$\sigma W^*(T_t) = \sigma W(T_t) + (\mu - r)t - \frac{1}{2}\sigma^2 T_t, \quad (31)$$

which is standard Brownian motion, so that $$\log P_{t_1} = \log P_t + r(t_1 - t) + \frac{1}{2}\sigma^2(T_{t_1} - T_t) + \sigma(W^*(T_{t_1}) - W^*(T_t)) \quad (32)$$

and $W^*(T_{t_1})-W^*(T_t)$ is independent of $\mathcal{F}_t$, with the distribution of $W^*(T_{t_1}-T_t)$. Then, $$e^{-r(t_1-t)}\tilde{E}(P_{t_1}-K)^+|\mathcal{F}_t)=e^{-r(t_1-t)}E((P_te^Z-K)^+|P_t) \quad (33)$$

where Z has the normal distribution with mean $r(t_1-t)+\frac{1}{2}\sigma^2(T_{t_1}-T_t)$ and variance $\sigma^2(T_{t_1}-T_t)$. Then rewriting equation (33) explicitly in terms of the normal distribution for Z, there is now obtained the expression $$E((P_te^Z - K)^+ | P_t) = \frac{1}{\sigma\sqrt{2(T_{t_1}-T_t)\pi}}\int_{z>-\log(P_t/K)} (P_te^z - K) \exp\left\{-\frac{\left(z - r(t_1-t) - \frac{1}{2}\sigma^2(T_{t_1}-T_t)\right)^2}{2\sigma^2(T_{t_1}-T_t)}\right\}dz, \quad (34)$$

which transforms to give, still conditioned on fixed (non-random) $\{T\}$, $$E(C(t,t_1,K)|\{T\})=P_t[\Phi(d(t_1,t))]-K\exp(r(t-t_1))[\Phi(d(t-t_1)-\sigma(T_{t_1}-T_t)^{1/2}], \quad (35)$$

where $$d(t_1, t) = \frac{\log(P_t/K) + r(t_1 - t) + \frac{1}{2}\sigma^2(T_{t_1} - T_t)}{\sigma(T_{t_1} - T_t)^{\frac{1}{2}}} \quad (36)$$

and $$\Phi(x) = \frac{1}{\sqrt{2\pi}}\int_{-\infty}^{x} e^{-\frac{1}{2}u^2} du \quad$$

is the distribution function of the standard normal. Thus, unconditionally (i.e., regardless of whether $T_t$, is a random or non-random function of t), $$C(t,t_1,K)=P_tE[\Phi(d(t_1,t))]-K\exp(r(t-t_1))E[\Phi(d(t_1,t)-\sigma(T_{t_1}-T_t)^{1/2}] \quad (37)$$

with the expectation "E" being taken over the distribution $T_{t_1}-T_t$.

In the special case of the geometric Brownian motion model and the Black-Scholes formula, $T_{t_1}-T_t=t_1-t$ with probability one, where $t_1-t$ is constant, and the expectation disappears. However, in general $T_{t_1}-T_t$ is random.

In the case of the fractal activity time model of the present invention, since $\{T_t\}$ has stationary differences, it is known that $$T_{t_1}-T_t \underset{=}{d} T_{t_1-t}\underset{=}{d} t_1-t+(t_1-t)^\kappa(T_1-1) \quad (38)$$

where $\underset{=}{d}$ denotes equality in distribution and $\kappa$ is the fractal scaling parameter.

For calculation of option valuations an advantageous choice for a distribution for $T_t$ is a scaled generalized inverse Gaussian distribution whose probability density is of the form $$g_\nu(x) = \frac{((\nu-2)/2)^{\nu/2}}{\Gamma(\nu/2)}x^{-\nu/2-1}e^{-(\nu-2)/2x}, x > 0, \nu > 2. \quad (39)$$

where $\Gamma$ is the gamma function $$\Gamma(y) = \int_0^\infty u^{y-1}e^{-u}du,$$

$\nu$ is a fixed parameter to be estimated from the data, and x is a dummy variable defining the function over the interval $(0, \infty)$.

Figure 3C:
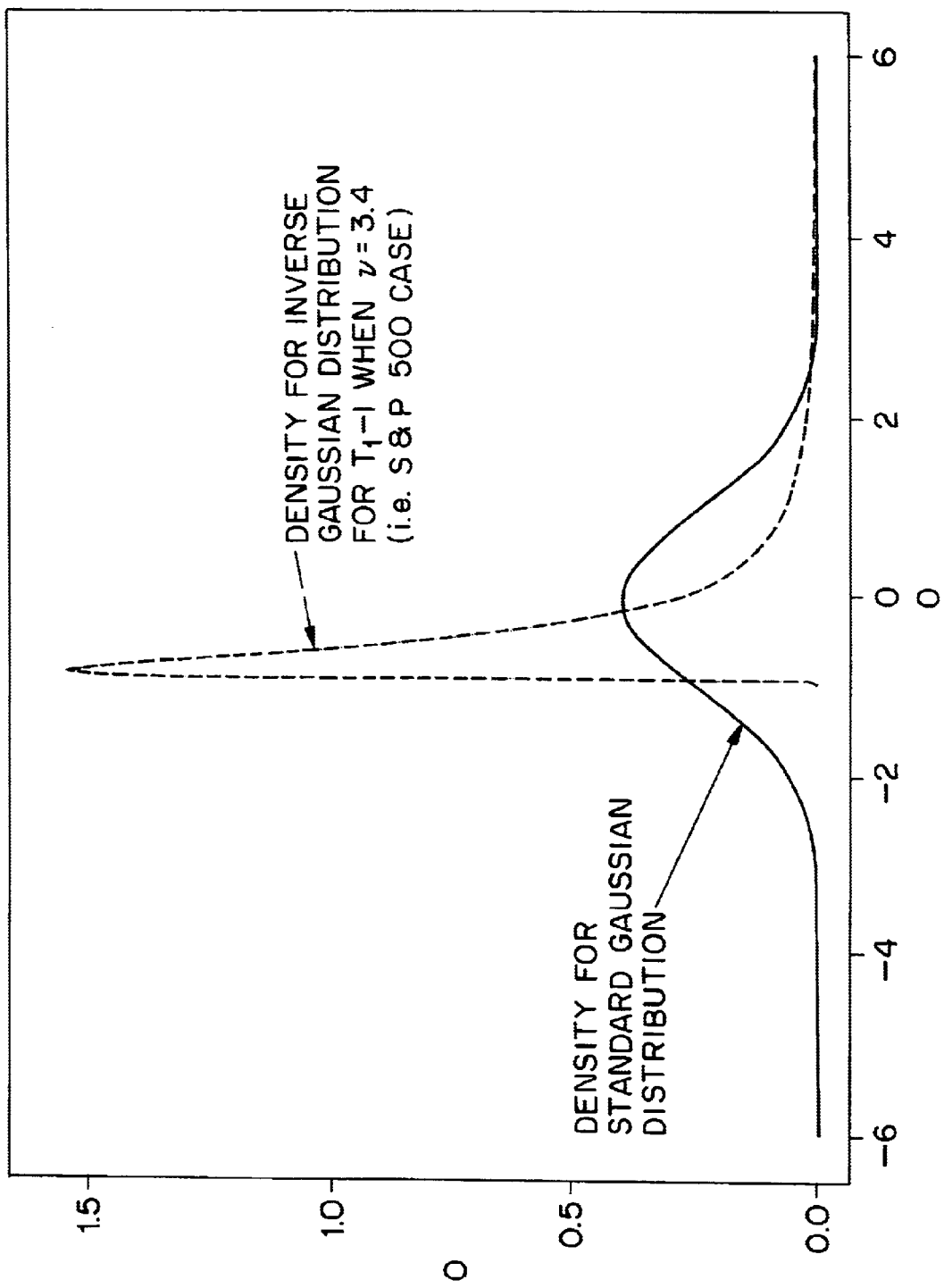
FIG. 3c is a graph illustrating the probability densities of a $\{T_1-t\}$ process and a standard Gaussian process, where $T_1$ is a scaled generalized inverse Gaussian distribution.

This choice of distribution gives rescaled t distributions for the one dimensional distribution of the log price which has been shown to fit the data in various empirical studies. (See, e.g., S. R. Hurst, E. Platen, and S. T. Rachev, "Subordinated Market Index Models: A Comparison," Financial Engineering and the Japanese Markets 4 (1997), pp. 97–104. The parameter $\nu$ is fitted from data in any particular case. If $\{X_t=\log P_t-\log P_{t-1}\}$, then the $X_t$ has a rescaled t distribution with $\nu$ degrees of freedom. If $N_x$=number of $|X_t|>x$ is regressed on logx then the slope estimates $-\nu$. For the model of the S&P 500 Index data of Example 1, the estimated value of $\nu$ is 3.4. An exemplary distribution for $T_1$ is the inverse Gaussian given in Equation (39). The probability densities of $(T_1-1)$ with $\nu=3.4$ are illustrated in the graph of FIG. 3c. For comparison, FIG. 3c also includes a plot of the probability densities of a standard Gaussian distribution.

Calculations of the value $C(t, t_1, K)$ are most conveniently done by expressing it in terms of the "moneyness" x defined by $$P_te^{r(t_1-t)}=Ke^x. \quad (40)$$

Then, using (37) and (38), $$C(t, t_1, K) = P_t\left[E\Phi\left(\frac{x+\frac{1}{2}\sigma^2 T_{t_1-t}}{\sigma T_{t_1-t}^{1/2}}\right) - e^{-x}E\Phi\left(\frac{x-\frac{1}{2}\sigma^2 T_{t_1-t}}{\sigma T_{t_1-t}^{1/2}}\right)\right]. \quad (41)$$

Also, again using (38), $T_{t_1-t}$ has the same distribution as $$t_1-t+(t_1-t)^\kappa(T_1-1)=t_1-t-(t_1-t)^\kappa+(T_1-t)^\kappa T_1. \quad (42)$$

Now, if $g^v(x)$ is the probability density function (39) for $T_1$, then $$E\left(\Phi\left(\frac{x \pm \frac{1}{2}\sigma^2 T_{t_1-t}}{\sigma T_{t_1-t}^{1/2}}\right)\right) = \tag{43}$$

$$\int_0^\infty \Phi\left(\frac{x \pm \frac{1}{2}\sigma^2(t_1 - t - (t_1 - t)^\kappa + (t_1 - t)^\kappa x)}{\sigma(t_1 - t - (t_1 - t)^\kappa + (t_1 - t)^\kappa x)^{1/2}}\right) g_v(x) dx,$$

where $\kappa$ is the fractal scaling parameter of Equations (24) and (25). The factal scaling parameter $\kappa$ is calculated from the $\{T_{n\delta}\}$ data using, for example, the algorithm of FIG. 1. This integration can be done in any particular case using the Splus programming language.

To give a numerical illustration, the case of the S&P 500 Index data is used, for which the estimated values of the parameters are $J=0.01$, $\kappa=0.8$, $v=3.4$. It is also assumed that $t_1-t=90$ (i.e. a 3 month time interval). Then, in the fundamental case of $x=0$ (called "at the moneyness")

$$C(t, t+90, K)(0) = P_t\left(2E\left(\Phi\left(\frac{1}{2}\sigma T_{90}^{1/2}\right)\right) - 1\right). \tag{44}$$

This gives (0.0362) $P_t$, in contrast to the Black-Scholes valuation, $$P_t\left(2\Phi\left(\frac{1}{2}\sigma\sqrt{90}\right) - 1\right) = (0.0378)P_t, \tag{45}$$

resulting in roughly a 5% difference. Accordingly, if the analysts driving the market price of the option employ the conventional Black-Scholes model, then the new method of the invention will provide the user of the new method with the important information that the option is overvalued by 5% and should therefore be sold, not bought, at the market price.

EXAMPLE 3

Valuation of a European Put Option

The present invention can also be applied, for example, to the valuation of a European put option for a traded financial security where the time parameter data generated from the data of the security over time exhibits self similarity. A European put option gives the holder the right, but not the obligation, to sell the security for an exercise price K when the option matures at time $t_1$. If arbitrage is not permitted and there is a fixed interest rate r for bonds, the price $P(t,t_1,K)$ of such a European put option may be obtained from the relation $$P_t + P(t,t_1,K) - C(t,t_1,K) = Ke^{-r(t_1-t)} \tag{46}$$

where $C(t,t_1,K)$ is the corresponding European call option value for the same security calculated in accordance with Example 2 hereinabove, and $P_t$ is the price of the underlying traded asset at time t.

EXAMPLE 4

Valuation of an American Call Option

The present invention can also be applied, for example, to valuate an American call option for a traded security where the time parameter data generated from the price data of the security over time exhibits self similarity, such that the security price can be modeled as a random process in accordance with the present invention. An American option gives the holder the right, but not the obligation, to purchase the security at an exercise price K at any time t before an expiration time $t_1$. It is well known that it is suboptimal to exercise an American call option before its expiration time $t_1$. Therefore, the value of an American call option is the same as that of the corresponding European call option described in Example 2 hereinabove.

EXAMPLE 5

Valuation of an American Put Option

The invention can also be applied, for example, to valuate an American put option for a traded security where the time parameter data generated from the price data of the security over time exhibits self similarity, such that the security price can be modeled as a random process in accordance with the present invention. An American put option gives the holder the right to sell the security for an exercise price K at any time t before an expiration time $t_1$. No closed form expression is available for the value of an American put option in the case of the geometric Brownian motion model. Results must be obtained by numerical methods. A simple adaptation of the binomial tree method may be used to obtain approximate valuations using the fractal activity time model of the present invention.

EXAMPLE 6

Valuation of Exotic Options

The present invention is likewise applicable, for example, to the valuation of so-called exotic options for traded securities where the time parameter data generated from the price data of the security over time exhibits self similarity, such that the security price can be modeled as a random process in accordance with the present invention. Various exotic options are easily valued using risk-neutral valuation principles and the European call option valuation within the classical Black-Scholes framework. Examples of exotic options are collar, break forward, range forward, forward start, chooser, digital, barrier and lookback options, as described, for example, in Chapter 9 of the book by M. Musiela and M. Rutwowski, entitled *Martingale Methods in Financial Modelling*, Springer, Berlin, 1998. The valuations described are easily replaced by new versions calculated under the fractal activity time model of the present invention.

Other exotic options such as Asian and basket options require numerical methods for their calculation in the case of geometric Brownian motion model. Valuations can be done under the fractal activity time model of the present invention using Monte Carlo methods.

Computer Implementation of Methods According to the Invention

It will be appreciated by those skilled in the art that the exemplary algorithm represented by the flow diagram of FIG. 1 can be implemented through interactive computing on various standard computer hardware platforms operating under the control of suitable software implementing the interactive computing of the algorithm defined by the flow diagram of FIG. 1. In some cases, dedicated computer hardware, such as a peripheral card which resides on the bus of a standard personal computer, may enhance the operational efficiency of the above methods.

FIGS. 7 and 8 illustrate typical computer hardware suitable for practicing the present invention. The exemplary computer system of FIG. 7 includes a computer section 710, a display 720, a keyboard 730, and a communications peripheral device 740, such as a modem. The system may also include other input devices such as a CD ROM drive 750 for reading a CD ROM 700 and a printer 760. The computer system generally includes one or more disk drives 770 which can read and write to computer-readable media, such as magnetic media (i.e., diskettes or hard disks) for storing data and software. The data and software can include, e.g., instructions to direct the computer system to perform the steps of the invention. While not shown, other input devices, such as a digital pointer (e.g., a "mouse") and the like may also be included.

FIG. 8 is a functional block diagram which further illustrates the computer section 710. The computer section 710 typically includes a processing unit 810, control logic 820 and a memory unit 830. Preferably, computer section 710 can also include a timer 850 and input/output ports 840. The computer section 710 can also include a co-processor 860, depending on the microprocessor used in the processing unit. Control logic 820 provides, in conjunction with processing unit 810, the control necessary to handle communications between memory unit 830 and input/output ports 840. Timer 850 provides a timing reference signal for processing unit 810 and control logic 820. Co-processor 860 provides an enhanced ability to quickly perform numerous and/or complex computations, such as those involving large data sets.

Memory unit 830 may include different types of memory, such as volatile and non-volatile memory and read-only and programmable read-only memory. For example, as shown in FIG. 8, memory unit 830 may include read-only memory (ROM) 831, electrically erasable programmable read-only memory (EEPROM) 832, and random-access memory (RAM) 833. Different computer processors, memory configurations, data structures and the like can be used to practice the present invention, and the invention is not limited to a specific hardware or software platform.

An example of a programming language which is well-suited for practicing the invention is Splus, version 3.4 or 5.0, which can run on a Unix operating system. Splus was originally developed by A. T. & T. Bell Laboratories, and is currently marketed by MathSoft. An Splus program can, for example, be run on a Sun Sparkstation or an equivalent computer.

Although the present invention has been described by way of specific exemplary embodiments, it should be understood that various changes, substitutions and alterations to the disclosed embodiments will be apparent to those skilled in the art, and can be made without departing from the spirit and scope of the invention as set forth in the appended claims.

APPENDIX

Exemplary Interactive Computer Procedure and
Corresponding Splus Code for Implementing the
Algorithm of FIG. 1

Note that this exemplary interactive computing procedure utilizes human judgment at various steps. It is preferable to use at least several thousand observations of the random process being modeled. For financial processes the return data is typically daily, so that for this example δ=1. An exemplary procedure is provided as follows:

Return data $\{P_k\}$ is placed into a vector u.

Calculate v which is log u (gives vector of the log $P_k$).

Calculate x which is diff(v, lag=1) (gives vector of the $X_t = \log P_k - \log P_{(k-1)}$).

acf(x,n) generates autocovariances of elements in vector x out to lag n and plots these. This is done for the vectors x, abs(x) and various n values, say n=50 or n=100. The autocovariances for x should die out very quickly, while those for abs(x) can be expected to be significantly different from zero even for n=50 or more.

Generate a standardized array z which is $((x)-\text{mean}(x))/(\text{var}(x))^{1/2}$.

Calculate $\text{mean}((\text{abs}(z))^r)$ for a range of r values, say at intervals of 0.25 until the function begins to increase steeply. (This indicates where $E|X_1|^r$ ceases to be finite.)

Calculate w which is cumsum ($z^2$) (Generates the empirical activity time process $\hat{T}$ which can be plotted using ts.plot(w).)

Calculate the $\hat{S}_q(m)$. The vector of $\hat{T}_k - \hat{T}_{(k-m)}$ is given by um which is diff(w, lag=m). Then take vm which is abs((um)-m) and $\hat{S}_q(m)$ is given by $\text{mean}((vm)^q)$. For m values, use, for example, $m=5.2^j$, j=0, 1, . . . , 7.

Plot $\log \hat{S}_q(m)$ against log m using the plot (x, y) function in Splus for the range of q values for which T, has finite absolute moments as determined earlier. Check the plots for linearity of the plots.

Estimate the $E|T_1-1|^q$ using $\text{mean}(\text{abs}(u1-1)^q)$. Plot $\log \hat{S}_q(m) - \log E|\hat{T}_1-1|^q$ for the q values used in the previous step. Check for linearity of the plots and constancy of estimated $\hat{K}$.

A summary of an exemplary code sequence for implementing the computing portions of the above procedure is provided as follows:

v<-log(u)
x<-diff(v, lag=1)
acf(x, 200)
z<-((x)-mean(x))/(var(x))^(1/2)
mean((abs(z)^r)
w<-cumsum(z^2)
um<-diff(w, lag=m)
vm<-abs((um)-m)
log(mean(vm)^q)
mean((abs((u1)-1))^q)
plot(x, y) (various values of x, y)

I claim:

1. A method for computing a financial value of at least one financial instrument, the at least one financial instrument having a price history representable at least in part by a random process, the method comprising:

providing time-parameter data corresponding to an approximation of a fractal activity time process;

using the time-parameter data to determine whether the random process exhibits at least one of fractal scaling and self-similarity; and if the random process exhibits at least one of fractal scaling and self-similarity, determining that a model based upon the time-parameter data is valid for modeling the random process for computing the financial value of the at least one financial instrument.

2. A method according to claim 1, wherein the step of providing time-parameter data comprises:

providing a sequence of data points derived from values of the random process; and using the sequence to generate the time-parameter data.

3. A method according to claim 2, wherein the step of using the sequence comprises:
  standardizing the sequence to thereby generate a standardized sequence; and
  performing a plurality of summations, each comprising adding squares of a plurality of terms of the standardized sequence to produce a quantity corresponding to at least one element of the time-parameter data.

4. A method according to claim 3, wherein the step of using the time-parameter data comprises:
  generating model-testing data having a plurality of members, wherein generation of each member of the model-testing data comprises a step of scaling a function derived from the time-parameter data, wherein the step of scaling is performed using at least one of a time-scaling parameter and a magnitude-scaling parameter; and
  assessing linearity of a function derived from the model-testing data, wherein said linearity is defined with respect to said at least one of a time-scaling parameter and a magnitude-scaling parameter.

5. A method according to claim 4, wherein the step of providing a sequence of data points derived from values of the random process comprises:
  obtaining a sequence of values of the random process;
  computing logarithms of successive terms of the sequence of values of the random process; and
  computing a sequence of differences of said logarithms, wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

6. A method according to claim 4, wherein the time-parameter data is a data set $\{\hat{T}_{k\delta}, k=1,2,\ldots\}$ represented by a fractal activity time vector w, where k is a scalar index, and wherein the step of scaling comprises:
  a. calculating a model test function $\hat{S}_q(m)$ for a plurality of combinations of values of m and q, wherein the time-scaling parameter equals log m and q represents the magnitude-scaling parameter, wherein $0<q\leq p$, comprising, for each of said plurality of combinations of m and q, performing the steps of:
    i. generating a vector um=diff(w, lag=m), where diff(w, lag=m) represents a data set $\{\hat{T}_{k\delta}-\hat{T}_{(k-m)\delta}\}$,
    ii. generating a vector vm=abs((um)−mδ), and
    iii. calculating $\hat{S}_q(m)=\text{mean}((vm)^q)$;
  b. using values of $\hat{S}_q(m)$ obtained from step a to calculate log $\hat{S}_q(m)$ for a plurality of values of m;
  c. calculating $E_q=\text{mean}(\text{abs}(u1-\delta))^q$ for a plurality of values of q, where u1 is the vector um with m=1; and
  d. using values of $\hat{S}_q(m)$ obtained from step a, and values of $E_q$ obtained from step c, to calculate $F_q=\log \hat{S}_q(m)-\log E_q$ for a plurality of values of q, wherein the step of assessing linearity comprises:
    i. assessing linearity of log $\hat{S}_q(m)$ with respect to log m, and
    ii. assessing linearity of $F_q$ with respect to q.

7. A method according to claim 2, wherein the step of using the time-parameter data comprises:
  generating model-testing data having a plurality of members, wherein generation of each member of the model-testing data comprises a step of scaling a function derived from the time-parameter data, the step of scaling being performed using at least one of a time-scaling parameter and a magnitude-scaling parameter; and
  assessing linearity of a function derived from the model-testing data, the linearity being defined with respect to said at least one of a time-scaling parameter and a magnitude-scaling parameter.

8. A method according to claim 7, wherein the step of providing a sequence of data points derived from values of the random process comprises:
  obtaining a sequence of values of the random process;
  computing logarithms of successive terms of the sequence of values of the random process; and
  computing a sequence of differences of said logarithms, and wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

9. A method according to claim 7, wherein the time-parameter data is a data set $\{\hat{T}_{k\delta}, k=1,2,\ldots\}$ represented by a fractal activity time vector w, where k is a vector index, and wherein the step of scaling comprises:
  a. calculating a model test function $\hat{S}_q(m)$ for a plurality of combinations of values of m and q, wherein the time-scaling parameter equals log m and q represents the magnitude-scaling parameter, wherein $0<q\leq p$, comprising, for each of said plurality of combinations of m and q, performing the steps of:
    i. generating a vector um=diff(w, lag=m), where diff(w, lag=m) represents a data set $\{\hat{T}_{k\delta}-\hat{T}_{(k-m)\delta}\}$,
    ii. generating a vector vm=abs((um)−mδ), and
    iii. calculating $\hat{S}_q(m)=\text{mean}((vm)^q)$;
  b. using values of $\hat{S}_q(m)$ obtained from step a to calculate log $\hat{S}_q(m)$ for a plurality of values of m;
  c. calculating $E_q=\text{mean}(\text{abs}(u1-\delta))^q$ for a plurality of values of q, where u1 is the vector um with m=1; and
  d. using values of $\hat{S}_q(m)$ obtained from step a, and values of $E_q$ obtained from step c, to calculate $F_q=\log \hat{S}_q(m)-\log E_q$ for a plurality of values of q, wherein the step of assessing linearity comprises:
    i. assessing linearity of log $\hat{S}_q(m)$ with respect to log m, and
    ii. assessing linearity of $F_q$ with respect to q.

10. A method according to claim 1, wherein the step of using the time-parameter data comprises:
  generating model-testing data having a plurality of members, wherein generation of each member of the model-testing data comprises a step of scaling a function derived from the time-parameter data, the step of scaling being performed using at least one of a time-scaling parameter and a magnitude-scaling parameter; and
  assessing linearity of a function derived from the model-testing data, said linearity being defined with respect to said at least one of a time-scaling parameter and a magnitude-scaling parameter.

11. A method according to claim 10, wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

12. A method according to claim 10, wherein the time-parameter data is a data set $\{\hat{T}_{k\delta}, k=1,2,\ldots\}$ represented by a fractal activity time vector w, where k is a vector index, and wherein the step of scaling comprises:
  a. calculating a model test function $\hat{S}_q(m)$ for a plurality of combinations of values of m and q, wherein the time-scaling parameter equals log m and q represents the magnitude-scaling parameter, wherein $0<q\leq p$, comprising, for each of said plurality of combinations of m and q, performing the steps of:
    i. generating a vector um=diff(w, lag=m), where diff(w, lag=m) represents a data set $\{\hat{T}_{k\delta}-\hat{T}_{(k-m)\delta}\}$,
    ii. generating a vector vm=abs((um)−mδ), and
    iii. calculating $\hat{S}_q(m)$=mean((vm)$^q$);
  b. using values of $\hat{S}_q(m)$ obtained from step a to calculate log $\hat{S}_q(m)$ for a plurality of values of m;
  c. calculating $E_q$=mean(abs(u1−δ))$^q$ for a plurality of values of q, where u1 is a value of the random process at a selected time; and
  d. using values of $\hat{S}_q(m)$ obtained from step a, and values of $E_q$ obtained from step c, to calculate $F_q$=log $\hat{S}_q(m)$−log $E_q$ for a plurality of values of q, wherein the step of assessing linearity comprises:
    i. assessing linearity of log $\hat{S}_q(m)$ with respect to log m, and
    ii. assessing linearity of $F_q$ with respect to q.

13. A method according to claim 1, further comprising the step of using the time-parameter data as a time parameter of a model of the random process if the random process exhibits at least one of fractal scaling and self-similarity.

14. A method for computing a financial value of at least one financial instrument, the at least one financial instrument having a price history representable at least in part by a random process, the method comprising:
  providing a sequence of data points derived from values of the random process obtained from a number of observations thereof;
  computing at least one of a sequence of squares of the data points and a sequence of magnitudes of the data points;
  computing an autocorrelation function of said at least one of a sequence of squares and a sequence of magnitudes; and
  if the autocorrelation function does not decrease by more than a threshold factor over a range no greater than a threshold number of observations of the random process, performing the steps of:
    using the sequence of data points to generate time-parameter data corresponding to an approximation of a fractal activity process;
    using the time-parameter data to determine whether the random process exhibits at least one of fractal scaling and self-similarity; and
    if the random process exhibits at least one of fractal scaling and self-similarity, determining that a model based upon the time-parameter data is valid for modeling the random process for computing the financial value of the at least one financial instrument.

15. A method according to claim 14, wherein the step of using the sequence comprises:
  standardizing the sequence to thereby generate a standardized sequence; and
  performing a plurality of summations, each comprising adding squares of a plurality of terms of the standardized sequence to thereby produce a value corresponding to at least one element of the time-parameter data.

16. A method according to claim 14, wherein the step of using the time-parameter data comprises:
  generating model-testing data having a plurality of members, wherein generation of each member of the model-testing data comprises a step of scaling a function derived from the time-parameter data, the step of scaling being performed using at least one of a time-scaling parameter and a magnitude-scaling parameter; and
  assessing linearity of a function derived from the model-testing data, said linearity being defined with respect to said at least one of a time-scaling parameter and a magnitude-scaling parameter.

17. A method for computing a financial value of at least one financial instrument, the at least one financial instrument having a price history representable at least in part by a random process, the method comprising:
  providing time-parameter data corresponding to an approximation of a fractal activity time process;
  using the time-parameter data as a time parameter of a model of the random process; and
  using the model for modeling the random process for computing the financial value of the at least one financial instrument.

18. A method for using a computer to compute a financial value of at least one financial instrument, the at least one financial instrument having a price history representable at least in part by a random process, the computer having a memory and a processor in communication with the memory, the method comprising:
  storing, in the memory, time-parameter data corresponding to an approximation of a fractal activity time process;
  using the processor to analyze the time-parameter data to allow determination of whether the random process exhibits at least one of fractal scaling and self-similarity; and
  if the random process exhibits at least one of fractal scaling and self-similarity, determining that a model based upon the time-parameter data is valid for modeling the random process for computing the financial value of the at least one financial instrument.

19. A method according to claim 18, wherein the step of storing time-parameter data comprises:
  storing, in the memory, a sequence of data points derived from values of the random process; and
  using the processor to generate the time-parameter data from the sequence.

20. A method according to claim 19, wherein the step of using the processor to generate time parameter data from the sequence comprises:
  using the processor to standardize the sequence to thereby generate a standardized sequence;

storing, in the memory, terms of the standardized sequence; and using the processor to perform a plurality of summations, each comprising adding squares of a plurality of terms of the standardized sequence to produce a value corresponding to at least one element of the time-parameter data.

21. A method according to claim 20, wherein the step of using the processor to analyze the time-parameter data comprises:

using the processor to generate model-testing data having a plurality of members, wherein generation of each member of the model-testing data comprises a step of scaling a function derived from the time-parameter data, the step of scaling being performed using at least one of a time-scaling parameter and a magnitude-scaling parameter;

storing, in the memory, the members of the model-testing data; and providing a graphical output of a function derived from the model-testing data to allow assessment of linearity thereof, the linearity being defined with respect to the at least one of a time-scaling parameter and a magnitude-scaling parameter.

22. A method according to claim 21, wherein the step of storing a sequence of data points derived from values of the random process comprises:

storing, in the memory, a sequence of values of the random process;

using the processor to compute logarithms of successive terms of the sequence of values of the random process; and using the processor to compute a sequence of differences of said logarithms, and wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and wherein the function derived from the model-testing data comprises a logarithm.

23. A method according to claim 19, wherein the step of using the processor to analyze the time-parameter data comprises:

using the processor to generate model-testing data having a plurality of members, wherein generation of each member of the model-testing data comprises a step of scaling a function derived from the time-parameter data to generate a scaled array of elements, the step of scaling being performed using at least one of a time-scaling parameter and a magnitude-scaling parameter;

storing, in the memory, elements of the scaled array; and providing a graphical output of a function derived from the model-testing data to allow assessment of linearity thereof, the linearity being defined with respect to said at least one of a time-scaling parameter and a magnitude-scaling parameter.

24. A method according to claim 23, wherein the step of storing a sequence of data points derived from values of the random process comprises:

storing, in the memory, a sequence of values of the random process; and using the processor to compute logarithms of successive terms of the sequence of values of the random process; and using the processor to compute a sequence of differences of said logarithms, and wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, and the power being derived from the magnitude-scaling parameter, and the function derived from the model-testing data comprising a logarithm.

25. A method according to claim 18, wherein the step of using the processor to analyze the time-parameter data comprises:

using the processor to generate model-testing data having a plurality of members, wherein generation of each member of the model-testing data comprises a step of scaling a function derived from the time-parameter data to generate a scaled array of elements, the step of scaling being performed using at least one of a time-scaling parameter and a magnitude-scaling parameter;

storing, in the memory, the elements of the scaled array; and providing a graphical output of a function derived from the model-testing data to allow assessment of linearity thereof, the linearity being defined with respect to said at least one of a time-scaling parameter and a magnitude-scaling parameter.

26. A method according to claim 25, wherein said step of scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

27. A method according to claim 18, further comprising the step of the processor carrying out computations based on a model of the random process, wherein the time parameter data is used as a time parameter of the model if the random process exhibits at least one of fractal scaling and self similarity.

28. A method for using a computer to compute a financial value of at least one financial instrument, the at least one financial instrument having a price history representable at least in part by a random process, the computer having a memory and a processor in communication with the memory, the method comprising:

storing, in the memory, a sequence of data points derived from values of the random process obtained from a number of observations thereof;

using the processor to compute at least one of a sequence of squares of the data points and a sequence of magnitudes of the data points;

using the processor to compute an autocorrelation function of said at least one of the sequence of squares and the sequence of magnitudes; and if the autocorrelation function does not decrease by more than a threshold factor over a range no greater than a threshold number of observations of the random process, performing the steps of:

using the processor to generate, from the sequence of data points, time-parameter data corresponding to an approximation of a fractal activity time process;

using the processor to analyze the time-parameter data to allow determination of whether the random process exhibits at least one of fractal scaling and self-similarity; and if the random process exhibits at least one of fractal scaling and self-similarity, determining that a model based upon the time-parameter data is valid for modeling the random process for computing the financial value of the at least one financial instrument.

29. A method according to claim 28, wherein the step of using the processor to generate time-parameter data comprises:

using the processor to standardize the sequence of data points to generate a standardized sequence having a plurality of terms;

storing, in the memory, the terms of the standardized sequence; and using the processor to perform a plurality of summations, each comprising adding squares of a plurality of the terms of the standardized sequence to produce a value corresponding to at least one element of the time-parameter data.

30. A method according to claim 28, wherein the step of using the processor to analyze the time-parameter data comprises:

using the processor to generate model-testing data having a plurality of members, wherein generation of each member of the model-testing data comprises a step of scaling a function derived from the time-parameter data, the step of scaling being performed using at least one of a time-scaling parameter and a magnitude-scaling parameter;

storing, in the memory, the members of the model-testing data; and providing a graphical output of a function derived from the model-testing data to allow assessment of linearity thereof, the linearity being defined with respect to said at least one of a time-scaling parameter and a magnitude-scaling parameter.

31. A method for using a computer to compute a financial value of at least one financial instrument, the at least one financial instrument having a price history representable at least in part by a random process, the computer having a memory and a processor in communication with the memory, the method comprising:

storing, in the memory, time-parameter data corresponding to an approximation of a fractal activity time process; and using the processor to compute the financial value of the at least one financial instrument based on a model of the random process, wherein the time parameter data is used as a time parameter of the model.

32. A system for computing a financial value of at least one financial instrument, the at least one financial instrument having a price history representable at least in part by a random process, the system comprising:

a memory for storing time-parameter data corresponding to an approximation of a fractal activity time process; and a processor in communication with the memory and being programmed to analyze the time-parameter data to allow a determination of whether the random process exhibits at least one of fractal scaling and self-similarity, the determination of whether the random process exhibits at least one of fractal scaling and self-similarity being for determining whether a model based upon the time-parameter data is valid for modeling the random process for computing the financial value of the at least one financial instrument.

33. A system according to claim 32, wherein the memory for storing time-parameter data also stores a sequence of data points derived from values of the random process, and the processor is further programmed to use the sequence to generate the time-parameter data.

34. A system according to claim 33, wherein the processor is further programmed to standardize the sequence to generate a standardized sequence, and to perform a plurality of summations, wherein each summation comprises adding squares of a plurality of terms of the standardized sequence to produce a value corresponding to at least one element of the time-parameter data.

35. A system according to claim 34, wherein the memory further stores model-testing data, and wherein the processor is further programmed to generate the model-testing data, to generate a member of the model-testing data, and to scale a function derived from the time-parameter data, the scaling being performed using at least one of a time-scaling parameter and a magnitude-scaling parameter, the system further comprising an output device for providing a graphical output of a function derived from the model-testing data to allow assessment of linearity thereof, the linearity being defined with respect to said at least one of a time-scaling parameter and a magnitude-scaling parameter.

36. A system according to claim 35, wherein the processor receives a sequence of values of the random process and is further programmed to derive the sequence of data points from values of the random process, to compute logarithms of successive terms of the sequence of values of the random process, and to compute a sequence of differences of said logarithms, and wherein the scaling comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

37. A system according to claim 33, wherein the memory further stores model-testing data, and the processor is further programmed to generate the model-testing data, to generate a member of the model-testing data, to scale a function derived from the time-parameter data, the scaling being performed using at least one of a time-scaling parameter and a magnitude-scaling parameter, and the system further comprising an output device for providing a graphical output of a function derived from the model-testing data to allow assessment of linearity thereof, the linearity being defined with respect to said at least one of a time-scaling parameter and a magnitude-scaling parameter.

38. A system according to claim 37, wherein the processor receives a sequence of values of the random process from the memory and is further programmed to derive the sequence of data points from values of the random process, to compute the logarithms of successive terms of the sequence of values of the random process, and to compute a sequence of differences of said logarithms, wherein the scaling by the processor comprises performing a summation of a scaled sequence, each term of the summation of the scaled sequence comprising a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

39. A system according to claim 32, wherein the memory further stores model-testing data, and the processor is further programmed to generate the model-testing data, to generate a member of the model-testing data, and to scale a function derived from the time-parameter data, the scaling being performed using at least one of a time-scaling parameter and a magnitude-scaling parameter, and the system further comprising an output device for providing a graphical output of a function derived from the model-testing data to allow assessment of linearity thereof, the linearity being defined with respect to said at least one of a time-scaling parameter and a magnitude-scaling parameter.

40. A system according to claim 39, wherein the processor is further programmed to perform a summation of a scaled sequence, wherein each term of the summation of the scaled sequence comprises a magnitude term raised to a power, the magnitude term comprising a difference of selected members of the time-parameter data, the selected members being separated by an amount of time essentially proportional to the time-scaling parameter, the power being derived from the magnitude-scaling parameter, and the function derived from the model-testing data comprising a logarithm.

41. A system according to claim 32, wherein the processor is further programmed to carry out computations based on a model of the random process, wherein the time-parameter data is used as a time parameter of the model.

42. A system for computing a financial value of at least one financial instrument, the at least one financial instrument having a price history representable at least in part by a random process, the system comprising:
a memory for storing a sequence of data points derived from values of the random process through a number of observations thereof; and
a processor in communication with the memory programmed to compute at least one of a sequence of squares of the data points and a sequence of magnitudes of the data points, to compute an autocorrelation function of said at least one of the sequence of squares and the sequence of magnitudes, to determine whether the autocorrelation function decreases by more than a threshold factor over a range no greater than a threshold number of observations, to generate using the sequence of data points time-parameter data corresponding to an approximation of a fractal activity time process, wherein the processor is programmed to generate the time-parameter data if the processor determines that the autocorrelation function does not decrease by more than said threshold factor over said range, the time-parameter data being used to make a determination of whether the random process exhibits at least one of fractal scaling and self-similarity the determination being made if the processor determines that the autocorrelation function does not decrease by more than said threshold factor over said range, the determination of whether the random process exhibits at least one of fractal scaling and self-similarity being for determining whether a model based upon the time-parameter data is valid for modeling the random process for computing the financial value of the at least one financial instrument.

43. A system according to claim 42, wherein the processor is further programmed to standardize the sequence of data points to generate a standardized sequence, and to perform a plurality of summations, wherein each summation comprises adding squares of a plurality of terms of the standardized sequence to produce a value corresponding to at least one element of the time-parameter data.

44. A system according to claim 42, wherein the memory further stores model-testing data, and the processor is further programmed to generate the model-testing data, to generate a member of the model-testing data, to scale a function derived from the time-parameter data, wherein the scaling is performed using at least one of a time-scaling parameter and a magnitude-scaling parameter, and the system further comprises an output device for providing a graphical output of a function derived from the model-testing data to allow assessment of linearity thereof, the linearity being defined with respect to said at least one of a time-scaling parameter and a magnitude-scaling parameter.

45. A system for computing a financial value of at least one financial instrument, the at least one financial instrument having a price history representable at least in part by a random process, the system comprising:
a memory for storing time-parameter data corresponding to an approximation of a fractal activity time process; and
a processor in communication with the memory programmed to compute the financial value of the at least one financial instrument based on a model of the random process, wherein the time-parameter data is used as a time parameter of the model.

46. A method for computing a financial value of at least one financial instrument, the at least one financial instrument having a price history representable at least in part by a random process, the method comprising:
a. deriving a vector u from return data $\{P_{k\delta}, k=0, 1, \ldots\}$ of said random process, the return data $\{P_{k\delta}, k=0, 1, \ldots\}$ representing at least a portion of the price history of the at least one financial instrument. where k is a vector index and $\delta$ is a time step size;
b. calculating logarithms of respective elements of u to derive a vector v=log u;
c. calculating differences of pairs of elements $\log P_{k\delta}$ and $\log P_{(k-1)\delta}$ of v to thereby generate a vector x representing a data set $\{X_{k\delta}, k=0, 1, \ldots\}$, wherein $X_{k\delta}=\log P_{k\delta} - \log P_{(k-1)\delta}$, wherein $k\delta$ represents time, and wherein elements within each of said pairs are separated by a lag of $\delta$;
d. calculating absolute values of elements of x to thereby generate a vector abs(x);
e. generating data representing an autocovariance function of x, comprising:
i. selecting a first plurality of values of an autocovariance lag parameter n, and
ii. based upon each of said first plurality of values of n, calculating an autocovariance acf(x,n);
f. determining, from said autocovariance function of x, how rapidly said autocovariance function of x diminishes with respect to n;
g. generating data representing an autocovariance function of the absolute value of x abs(x), comprising:
i. selecting a second plurality of values of n, and
ii. based upon each of said second plurality of values of n, calculating acf(abs(x), n);

h. determining, from said autocovariance function of abs(x), how rapidly said autocovariance function of abs(x) diminishes with respect to n;

i. generating a standardized array $z=((x)-\text{mean}(x))/(\text{var}(x))^{1/2}$, wherein mean(x) denotes a mean of x, and wherein var(x) denotes a variance of x;

j. calculating an exponent test function $\text{mean}((\text{abs}(z))^r)$, for a plurality of values of r, wherein r is increased until the test function begins to increase rapidly with respect to r, thereby determining a maximum exponent value p for which the exponent test function converges;

k. calculating a fractal activity time vector $w=\text{cumsum}(z^2)$ representing a data set $\{\hat{T}_{k\delta}, k=1,2,\ldots\}$, wherein cumsum($z^2$) denotes a cumulative sum of $z^2$ with respect to index k;

l. calculating a model test function $\hat{S}_q(m)$ for a plurality of combinations of values of m and q, wherein $0<q\leq p$, comprising, for each of said plurality of combinations of m and q, performing the steps of:
  i. generating a vector um=diff(w, lag=m), where diff(w, lag=m) represents a data set $\{\hat{T}_{k\delta}-\hat{T}_{(k-m)\delta}\}$,
  ii. generating a vector vm=abs((um)-m$\delta$), and
  iii. calculating $\hat{S}_q(m)=\text{mean}((vm)^q)$;

m. using values of $\hat{S}_q(m)$ obtained from step l to determine linearity of log $\hat{S}_q(m)$ with respect to log m, to thereby determine whether the random process exhibits fractal scaling;

n. calculating $E_q=\text{mean}(\text{abs}(u1-\delta))^q$ for a plurality of values of q, wherein u1 is the vector um with m=1;

o. using values of $\hat{S}_q(m)$ obtained from step l, and values of $E_q$ obtained from step n, to determine linearity of $F_q=\log \hat{S}_q(m)-\log E_q$ with respect to q, to thereby determine whether the random process exhibits self-similarity; and p. confirming constancy of a slope of $F_q$ with respect to q, in order to verify that the fractal activity time vector w accurately models a time parameter T in an equation $P_t=P_o \exp[\mu t+\sigma W(T)]$, where $P_t$ represents a value of the random process at time t, $P_o$ is an initial value of $P_t$, $\mu$ and $\sigma$ are constants, and W(T) is a standard Brownian motion function of T, and the financial value of the at least one financial instrument at time t comprises $P_t$.

47. A method for computing a financial value of at least one financial instrument, the at least one financial instrument having a price history representable at least in part by a random process, the method comprising:

providing time parameter data having a distribution represented by a probability density of the form $$g_\nu(x) = \frac{((\nu-2)/2)^{\nu/2}}{\Gamma(\nu/2)} x^{-\nu/2-1} e^{-(\nu-2)/2x},$$

where x>0, $\nu$>2, $\Gamma$ is the gamma function, $\nu$ is a fixed parameter estimated from the time parameter data and x is a dummy variable defining the $g_\nu(x)$ over the interval (0, ∞);

using the time-parameter data to determine whether the random process exhibits at least one of fractal scaling and self-similarity; and if the random process exhibits at least one of fractal scaling and self-similarity, determining that a model based upon the time-parameter data is valid for modeling the random process for computing the financial value of the at least one financial instrument.

48. A method according to claim 47, wherein the step of providing time-parameter data comprises:

providing a sequence of data points derived from values of the random process; and using the sequence to generate the time-parameter data.

49. A method according to claim 47, wherein the step of using the time-parameter data comprises:

generating model-testing data having a plurality of members, wherein generation of each member of the model-testing data comprises a step of scaling a function derived from the time-parameter data, the step of scaling being performed using at least one of a time-scaling parameter and a magnitude-scaling parameter; and assessing linearity of a function derived from the model-testing data, said linearity being defined with respect to said at least one of a time-scaling parameter and a magnitude-scaling parameter.

50. A method according to claim 47, further comprising the steps of:

using the time-parameter data as a time parameter of the model if the random process exhibits at least one of fractal scaling and self-similarity; and using the model for modeling the random process for computing the financial value of the at least one financial instrument if the random process exhibits at least one of fractal scaling and self-similarity.

51. A method for using a computer to compute a financial value of at least one financial instrument, the at least one financial instrument having a price history representable at least in part by a random process, the computer having a memory and a processor in communication with the memory, the method comprising:

storing, in the memory, time-parameter data having a distribution represented by a probability density of the form $$g_\nu(x) = \frac{((\nu-2)/2)^{\nu/2}}{\Gamma(\nu/2)} x^{-\nu/2-1} e^{-(\nu-2)/2x},$$

where x>0, $\nu$>2, $\Gamma$ is the gamma function, $\nu$ is a fixed parameter estimated from the time parameter data and x is a dummy variable defining $g_\nu(x)$ over the interval (0, ∞);

using the processor to analyze the time-parameter data to allow determination of whether the random process exhibits at least one of fractal scaling and self-similarity; and if the random process exhibits at least one of fractal scaling and self-similarity, determining that a model based upon the time-parameter data is valid for modeling the random process for computing the financial value of the at least one financial instrument.

52. A method according to claim 51, wherein the step of storing time-parameter data comprises:

storing, in the memory, a sequence of data points derived from values of the random process; and using the processor to generate the time-parameter data from the sequence.

53. A method according to claim 51, wherein the step of using the processor to analyze the time-parameter data comprises:

using the processor to generate model-testing data having a plurality of members, wherein generation of each member of the model-testing data comprises a step of scaling a function derived from the time-parameter data to generate a scaled array of elements, the step of scaling being performed using at least one of a time-scaling parameter and a magnitude-scaling parameter;

storing, in the memory, the elements of the scaled array; and outputting a graphical representation of a function derived from the model-testing data to allow assessment of linearity thereof, the linearity being defined with respect to said at least one of a time-scaling parameter and a magnitude-scaling parameter.

54. A method according to claim 51, further comprising the step of using the processor to compute the financial value of the at least one financial instrument based on the model, wherein the time parameter data is used as a time parameter of the model, if the random process exhibits at least one of fractal scaling and self-similarity.

55. A system for computing a financial value of at least one financial instrument, the at least one financial instrument having a price history representable at least in part by a random process, the system comprising:

a memory for storing time-parameter data having a distribution represented by a probability density of the form $$g_\nu(x) = \frac{((\nu-2)/2)^{\nu/2}}{\Gamma(\nu/2)} x^{-\nu/2-1} e^{-(\nu-2)/2x},$$

where $x>0$, $\nu>2$, $\Gamma$ is the gamma function, $\nu$ is a fixed parameter estimated from the time parameter data and $x$ is a dummy variable defining $g_\nu(x)$ over the interval $(0, \infty)$; and a processor in communication with the memory programmed to analyze the time-parameter data to allow determination of whether the random process exhibits at least one of fractal scaling and self-similarity, the determination of whether the random process exhibits at least one of fractal scaling and self-similarity being for determining whether a model based upon the time-parameter data is valid for modeling the random process for computing the financial value of the at least one financial instrument.

56. A system according to claim 55, wherein the memory storing the time-parameter data also stores a sequence of data points derived from values of the random process, and the processor is further programmed to use the sequence to generate the time-parameter data.

57. A system according to claim 55, wherein the memory further stores model-testing data, and the processor is further programmed to generate the model-testing data, to generate a member of the model-testing data, to scale a function derived from the time-parameter data, the scaling being performed using at least one of a time-scaling parameter and a magnitude-scaling parameter, and the system further comprises an output device for providing a graphical output of a function derived from the model-testing data to allow assessment of linearity thereof, the linearity being defined with respect to said at least one of a time-scaling parameter and a magnitude-scaling parameter.

58. A system according to claim 55, wherein the processor is further programmed to compute the financial value of the at least one financial instrument based on the model, wherein the time parameter data is used as a time parameter of the model.

59. A method for computing a financial value of at least one financial instrument, the at least one financial instrument having a price history representable at least in part by a random process, the method comprising:

providing time-parameter data $\{\hat{T}_{n\delta}, n=1,2 \ldots\}$ corresponding to an approximation of a fractal activity time process, wherein $\delta$ is a size of a time step; and using $\{\hat{T}_{n\delta}\}$ to model a value $P_t$ of the random process, the financial value of the at least one financial instrument at time t comprising $P_t$, wherein $P_t$ is represented by model data $\{P_{n\delta}, n=1,2, \ldots\}$, where $P_{n\delta}=P_o \exp[\mu n\delta + \sigma W(\hat{T}_{n\delta})]$, $P_o$ is an initial value of $P_t$, u and $\sigma$ are constants, and $W(\hat{T}_{n\delta})$ is a standard Brownian motion function of $\hat{T}_{n\delta}$.

60. A method for modeling a financial value $P_t$ of at least one financial instrument, the method comprising:

providing time-parameter data $\{\hat{T}_{n\delta}, n=1,2 \ldots\}$ corresponding to an approximation of a fractal activity time process, wherein $\delta$ is a size of a time step; and using $\{\hat{T}_{n\delta}\}$ to model the financial value $P_t$ of the at least one financial instrument, wherein $P_t$ is represented by model data $\{P_{n\delta}, n=1,2, \ldots\}$, where $P_{n\delta}=P_o \exp[\mu n\delta + \sigma W(\hat{T}_{n\delta})]$, $P_o$ is an initial value of $P_t$, $\mu$ and $\sigma$ are constants, and $W(\hat{T}_{n\delta})$ is a standard Brownian motion function of $\hat{T}_{n\delta}$.

61. A method according to claim 60, wherein $P_t$ comprises the price at time t of a traded asset.

62. A method according to claim 60, wherein $P_t$ comprises the price at time t of a publically traded financial security.

63. A method according to claim 60, wherein $P_t$ comprises an index of the prices at time t of publically traded financial securities.

64. A method for valuating a call option for a traded financial asset where time parameter data generated from price data of the asset over time exhibits at least one of fractal scaling and self similarity, the call option giving a holder the right, but not the obligation, to purchase the asset for an exercise price K at a maturity time $t_1$, the method comprising the steps of determining the value $C(t,t_1,K)$ of the call option at time t using the relation $$C(t,t_1,K)=P_t E[\Phi(d(t_1,t))]-K\exp(r(t-t_1))E[\Phi(d(t_1,t)-\sigma(T_{t_1}-T_t)^{1/2})],$$

where $$\Phi(x) = \frac{1}{\sqrt{2\pi}} \int_{-\infty}^{x} e^{-\frac{1}{2}u^2} du$$

is the distribution function of the standard normal and r is a fixed interest rate for bonds and $$d(t_1, t) = \frac{\log(P_t/K) + r(t_1 - t) + \frac{1}{2}\sigma^2(T_{t_1} - T_t)}{\sigma(T_{t_1} - T_t)^{\frac{1}{2}}}$$

with the expectation being taken over the distribution $T_{t_1}-T_t$, where $$T_{t_1}-T_t \stackrel{d}{=} t_1-t+(t_1-t)^\kappa(T_1-1),$$

where d denotes equality in distribution and $\kappa$ is a fractal scaling parameter, $T_1$ having a scaled generalized inverse Gaussian distribution having a probability density of the form $$g_\nu(x) = \frac{((\nu-2)/2)^{\nu/2}}{\Gamma(\nu/2)} x^{-\nu/2-1} e^{-(\nu-2)/2x},$$

where $x>0$, $\nu>2$, $\Gamma$ is the gamma function and $\nu$ is a fixed parameter estimated from the time parameter data and $x$ is a dummy variable defining $g_\nu(x)$ over the interval $(0, \infty)$.

65. A method for valuating a put option for a traded asset where time parameter data generated from price data of the asset over time exhibits at least one of fractal scaling and self similarity, the put option giving a holder the right, but not the obligation, to sell the asset at an exercise price K at a maturity time $t_1$, the method comprising the steps of determining the price $P(t,t_1,K)$, at time t, of the put option using the relation $$P_t + P(t,t_1,K) - C(t,t_1,K) = Ke^{-r(t_1 t)},$$

where r is a fixed interest rate for bonds, $P_t$ is the price of the asset at time t and $C(t,t_1,K)$ is the value of a call option for the same asset at time t, the call option giving a holder the right, but not the obligation, to purchase the security for an exercise price K at a maturity time $t_1$, and is given by the relation $$C(t,t_1,K) = P_t E[\Phi(d(t_1,t))] - K \exp(r(t-t_1)) E[\Phi(d(t_1,t) - \sigma(T_{t_1} - T_t)^{1/2})],$$

where $$\Phi(x) = \frac{1}{\sqrt{2\pi}} \int_{-\infty}^{x} e^{-\frac{1}{2}u^2} du$$

is the distribution function of the standard normal, r is a fixed interest rate for bonds and $$d(t_1, t) = \frac{\log(P_t/K) + r(t_1 - t) + \frac{1}{2}\sigma^2(T_{t_1} - T_t)}{\sigma(T_{t_1} - T_t)^{\frac{1}{2}}}$$

with the expectation being taken over the distribution $T_{t_1} - T_t$, where $$T_{t_1} - T_t \stackrel{d}{=} t_1 - t + (t_1 - t)^{\kappa}(T_1 - 1),$$

where $\stackrel{d}{=}$ denotes equality of distribution and $\kappa$ is a fractal scaling parameter, $T_1$ having a scaled generalized inverse Gaussian distribution having a probability density of the form $$g_v = \frac{((v-2)/2)^{v/2}}{\Gamma(v/2)} x^{-v/2-1} e^{-(v-2)/2x},$$

where x>0, v>2, $\Gamma$ is the gamma function, v is a fixed parameter estimated from the time parameter data and x is a dummy variable defining $g_v(x)$ over the interval $(0, \infty)$.

* * * * *

UNITED STATES PATENT AND TRADEMARK OFFICE
CERTIFICATE OF CORRECTION

PATENT NO. : 6,643,631 B1
DATED : November 4, 2003
INVENTOR(S) : Heyde, Christopher It is certified that error appears in the above-identified patent and that said Letters Patent is hereby corrected as shown below:

Title page,
Item [56], References Cited, OTHER PUBLICATIONS, "T. Mikosch," reference, "Statustical" should read -- Statistical --; and "R.J. Elliott," reference, "Calculas" should read -- Calculus --

Column 2,
Line 1, "$\sum_{k=0}^{\infty} \gamma_k$" should read -- $\sum_{k=0}^{\infty} \gamma_k$ --

Column 3,
Line 2, "$\sum_{i=1}^{n} |X_i|^p / n$" should read -- $\sum_{i=1}^{n} |X_i|^p / n$ --

Column 4,
Line 11, Eq. (3), "$W(T_{t-}1))$" should read -- $W(T_{t-1}))$ --

Line 32, Eq. (4), "$W(T_{t-1})) \underline{d} \mu$" should read -- $W(T_{t-1})) \stackrel{d}{=} \mu$ --

Line 34, "$\underline{d}$" should read -- $\stackrel{d}{=}$ --

Line 45, "$(\tau_t^{1/2}, \tau_{t+k}^{1/2})$" should read -- $(\tau_t^{1/2}, \tau_{t+k}^{1/2})$ --

Line 46, "$(X_t^2, X_{t+k}^2)$" should read -- $(X_t^2, X_{t+k}^2)$ --

Line 51, "heteroscedasity" should read -- heteroscedacity --

Column 5,
Line 6, Eq. "$T_{ct} - ct \underline{d} M(c)(T_t - t)$" should read -- $T_{ct} - ct \stackrel{d}{=} M(c)(T_t - t)$ -- (9), Line 9, "$\underline{d}$" should read -- $\stackrel{d}{=}$ --

Line 14, "$T_{tt} t_k$)." should read -- $T_{tt} - t_k$). --

Column 6,
Line 4, Eq. (11), "$\underline{d}$" should read -- $\stackrel{d}{=}$ --

Line 5, "$\underline{d}$" should read -- $\stackrel{d}{=}$ --

UNITED STATES PATENT AND TRADEMARK OFFICE
CERTIFICATE OF CORRECTION

PATENT NO.     : 6,643,631 B1
DATED          : November 4, 2003
INVENTOR(S)    : Heyde, Christopher It is certified that error appears in the above-identified patent and that said Letters Patent is hereby corrected as shown below:

Column 7,
Line 34, "distrbution" should read -- distribution --
Line 35, "Xδ1 ." should read -- $X_\delta$. --

Column 8,
Line 12, Eq. (21), "log *m*." should read -- *logm*. --
Lines 34 and 38, "log m." should read -- *logm*. --
Line 43, "identically-shaped" should read -- identically shaped --
Line 49, Eq. (24), "log *m*" should read -- *logm* --

Column 9,
Lines 50 and 54, "log m." should read -- *logm* --

Column 10,
Line 19, "0<p<2." should read -- 0<p≤2. --
Line 20, "dependance" should read -- dependence --

Column 11,
Line 4, Eq. (29), "$\mathcal{F}$" should read -- $\mathcal{F}_t$) --

Lines 9, 13, 28 and 30, "$\mathcal{F}$" should read -- $\mathcal{F}_t$ --

Column 12,
Line 12, Eq. 38,  "$\underline{\underline{d}}$" (both occurrences) should read -- $\stackrel{d}{=}$ --

Line 14, "$\underline{\underline{d}}$" should read -- $\stackrel{d}{=}$ --

Column 13,
Line 14, "factal" should read -- fractal --
Line 20, "J=0.01," should read -- σ = 0.01, --
Line 56, Eq. (46), "$Ke^{-r((t-t))}$" should read -- $Ke^{-r(t_1-t)}$ --

Column 17,
Lines 46 and 63, "log m" should read -- *logm* --

UNITED STATES PATENT AND TRADEMARK OFFICE
CERTIFICATE OF CORRECTION

PATENT NO. : 6,643,631 B1
DATED : November 4, 2003
INVENTOR(S) : Heyde, Christopher It is certified that error appears in the above-identified patent and that said Letters Patent is hereby corrected as shown below:

Column 18,
Lines 37 and 53, "log m" should read -- *logm* --

Column 19,
Lines 19 and 36, "log m" should read -- *logm* --

Column 30,
Lines 22 and 24, "publically" should read -- publicly --
Line 35, "$\sigma(T_{t1}-T_t)^{1/2]}$" should read -- $\sigma(T_{t_1-T_t})^{1/2}]$ --

Lines 52 and 54, "$\underset{\approx}{d}$" should read -- $\overset{d}{=}$ --

Column 31,
Line 7, "$Ke^{-r(t-t)}$," should read -- $Ke^{-r(t1-t)}$, --

Column 32,
Lines 10 and 12, "$\underset{\approx}{d}$" should read -- $\overset{d}{=}$ --

Signed and Sealed this

Ninth Day of November, 2004

JON W. DUDAS
*Director of the United States Patent and Trademark Office*